(12) United States Patent
Zai et al.

(10) Patent No.: US 7,176,797 B2
(45) Date of Patent: Feb. 13, 2007

(54) METHOD AND SYSTEM OF USING ACTIVE RFID TAGS TO PROVIDE A RELIABLE AND SECURE RFID SYSTEM

(76) Inventors: Li-Cheng Richard Zai, 106 Lester La., Los Gatos, CA (US) 95032; Xinyu Zang, 438 Madera Ave., #3, Sunnyvale, CA (US) 94806

( * ) Notice: Subject to any disclaimer, the term of this patent is extended or adjusted under 35 U.S.C. 154(b) by 277 days.

(21) Appl. No.: 10/978,125

(22) Filed: Oct. 29, 2004

(65) Prior Publication Data
US 2005/0093679 A1    May 5, 2005

Related U.S. Application Data

(60) Provisional application No. 60/516,359, filed on Oct. 31, 2003.

(51) Int. Cl.
G08B 13/14 (2006.01)
(52) U.S. Cl. .............. 340/572.1; 340/10.1; 340/825.36
(58) Field of Classification Search ............ 340/572.1, 340/572.4, 572.7, 10.1, 10.2, 825.36, 825.4, 340/539.1, 539.13
See application file for complete search history.

(56) References Cited

U.S. PATENT DOCUMENTS

| | | | |
|---|---|---|---|
| 6,720,888 B2* | 4/2004 | Eagleson et al. | 340/905 |
| 7,030,731 B2* | 4/2006 | Lastinger et al. | 340/10.1 |
| 2005/0270158 A1* | 12/2005 | Corbett, Jr. | 340/572.1 |

* cited by examiner

Primary Examiner—Toan N. Pham
(74) Attorney, Agent, or Firm—Mathews, Shepherd, McKay & Bruneau, P.A.

(57) ABSTRACT

The system of the present invention includes a large-zone RFID reader, a plurality of small-zone RFID readers, and a plurality of RFID tags. The large-zone RFID reader covers areas which are not covered by the small-zone RFID readers. The output power of the small-zone RFID readers is controlled by the large-zone RFID reader based on RFID tag operation patterns of the small-zone RFID readers. The system reliability is improved by a method that uses reliable RFID tags, RFID reader beacon signals, and RFID tag's repetitive transmitting signals to detect tag failures. The system security is provided by a method that uses integrated crypto engines in both the RFID tags and RFID readers.

52 Claims, 25 Drawing Sheets

LZR: Large Zone Reader
SZR: Small Zone Reader

METHOD AND SYSTEM OF USING ACTIVE RFID TAGS TO PROVIDE A RELIABLE AND SECURE RFID SYSTEM

CROSS REFERENCE TO RELATED APPLICATION

This application claims the benefit of U.S. Provisional Patent Application No. 60/516,359 filed Oct. 31, 2003, the entirety of which is hereby incorporated by reference into this application.

BACKGROUND OF THE INVENTION

1. Field of the Invention

This invention relates generally to RFID (Radio Frequency Identification) systems and more specifically relates to a method and system of using active tags for providing a reliable and secure RFID system.

2. Description of the Prior Art

RFID tags and readers have recently begun to enter the mass market. FIG. 1 illustrates a typical prior art RFID system, in which RFID reader 100 uses a first frequency to read RFID tags 117, 118, 119 and 120 in a large area that is populated with signposts 101–116. A second frequency is used to send commands from signpost 101–116 to the RFID tags 117, 118, 119 and 120. FIG. 2 shows a typical prior art RFID tag including low-frequency receiver 200, timer 201, microprocessor 202, UHF transmitter 203, and power source 204. Low-frequency receiver 200 receives commands from signposts 101–116 and UHF transmitter 203 sends data to RFID reader 100. A shortcoming of this prior art system is that the signposts cannot have overlapped zones and need careful cell planning, and the system needs at least two frequencies to operate and can encounter throughput problems when the RFID tag population increases in the large read zone of the RFID reader.

While this prior art system may be suitable to the early deployment of RFID applications, it is desirable to provide an improved system for reliability and throughput purposes in which a RFID reader network includes multiple readers using active RFID tags.

SUMMARY OF THE INVENTION

In view of the foregoing disadvantages inherent in the RFID system now present in the prior art, the present invention provides a method and system of using active tags for providing a reliable and secure RFID system. The method and system for providing a reliable and secure RFID system using active tags substantially departs from the concept and design of the prior art, and in so doing provides a reliable and secure reader network in which multiple RFID readers can simultaneously operate to provide a large area of coverage with minimal interference among the readers in the same network.

The present invention, which will be described subsequently in greater detail, provides a system to cover a large area using multiple readers that can simultaneously operate and a method to improve the system reliability. In this respect, before explaining at least one embodiment of the invention in detail, it is to be understood that the invention is not limited in its application to the details of block diagrams and flow charts set forth in the following description of illustrated in the drawings. The invention is capable of other embodiments and being practiced and carried out in various ways. Also, it is to be understood that the phraseology and terminology employed herein are for the purpose of the description and should not be regarded as limiting.

The present invention generally comprises a RFID system including reliable RFID tags and a plurality of RFID readers that can simultaneously operate to improve the system throughput and reliability. The system of the present invention includes a large-zone RFID reader, a plurality of small-zone RFID readers, and a plurality of RFID tags. The large-zone RFID reader covers areas which are not covered by the small-zone RFID readers. The output power of the small-zone RFID readers is controlled by the large-zone RFID reader based on RFID tag operation patterns of the small-zone RFID readers. The system reliability is improved by a method that uses reliable RFID tags, RFID reader's beacon signals, and the RFID tag's repetitive transmitting signals to detect RFID tag failures. The system security is provided by a method that uses integrated crypto engines in both the RFID tags and RFID readers.

The present invention provides for a method of using multiple RFID readers that can simultaneously operate in different frequencies thereby providing enhanced system throughput.

The present invention also provides for a method of using multiple RFID readers that can simultaneously operate in a single frequency thereby providing enhanced system throughput.

The present invention also provides for a method of controlling the output power of small-zone RFID readers by a large-zone RFID reader to improve the overall system coverage and performance.

The present invention also provides for a method of using a change in associated RFID reader IDs of a moving RFID tag to set and clear its TRANSIT status.

The present invention also provides a system including a RFID tag using a separate transmitting and receiving antenna to improve system reliability.

The present invention also provides for a method of using RFID reader beacons and RFID tag's repetitive transmission signals to detect a RFID tag's transmitting or receiving failure.

The present invention also provides a system in which a RFID reader and RFID tag use integrated crypto engines to improve the system security.

To the accomplishment of the above, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference block diagrams and flow charts, and wherein.

DESCRIPTION OF THE PREFERRED EMBODIMENT

Figure 1:
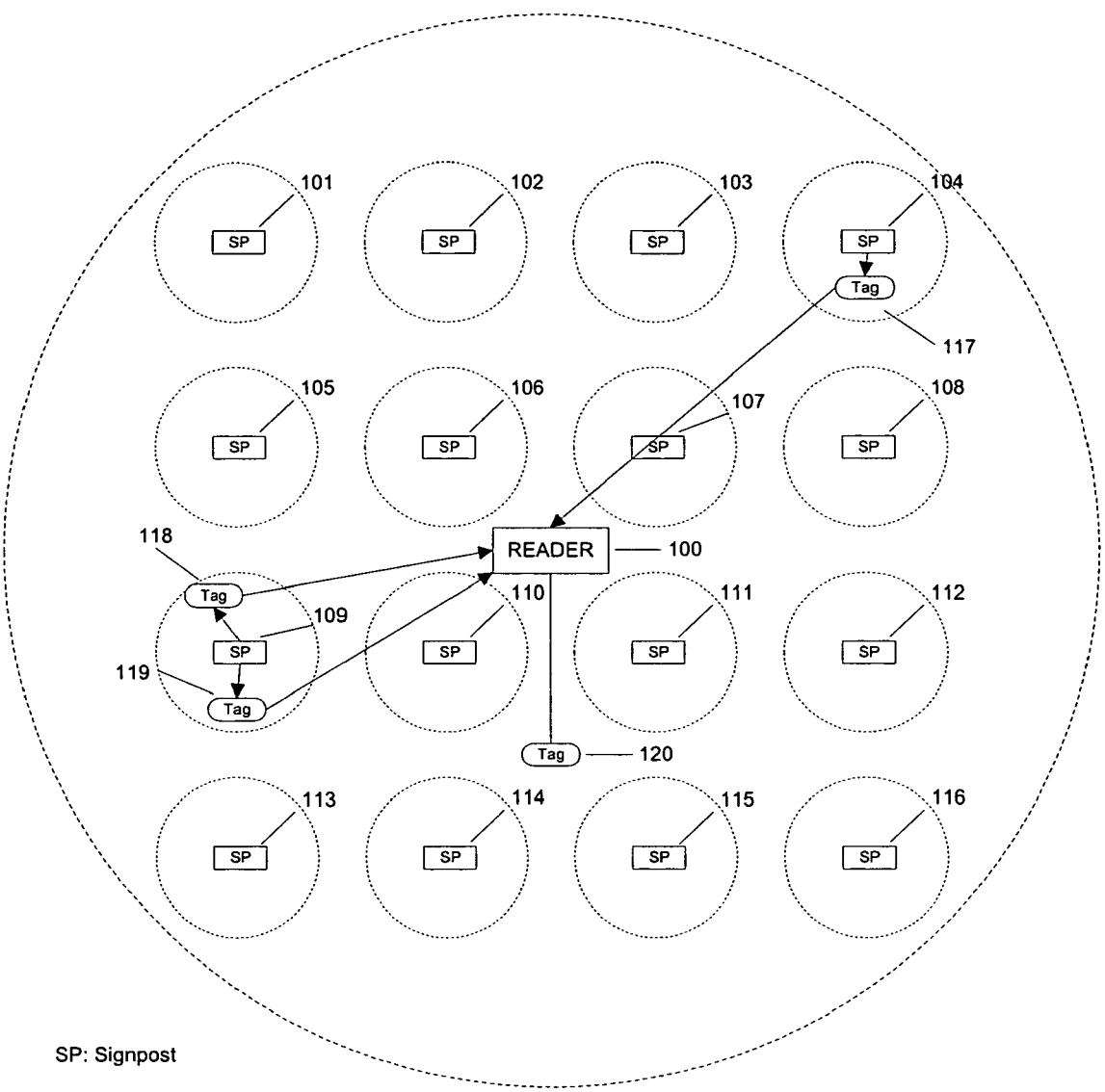
FIG. 1 is a schematic diagram of a prior art RFID system.
Figure 2:
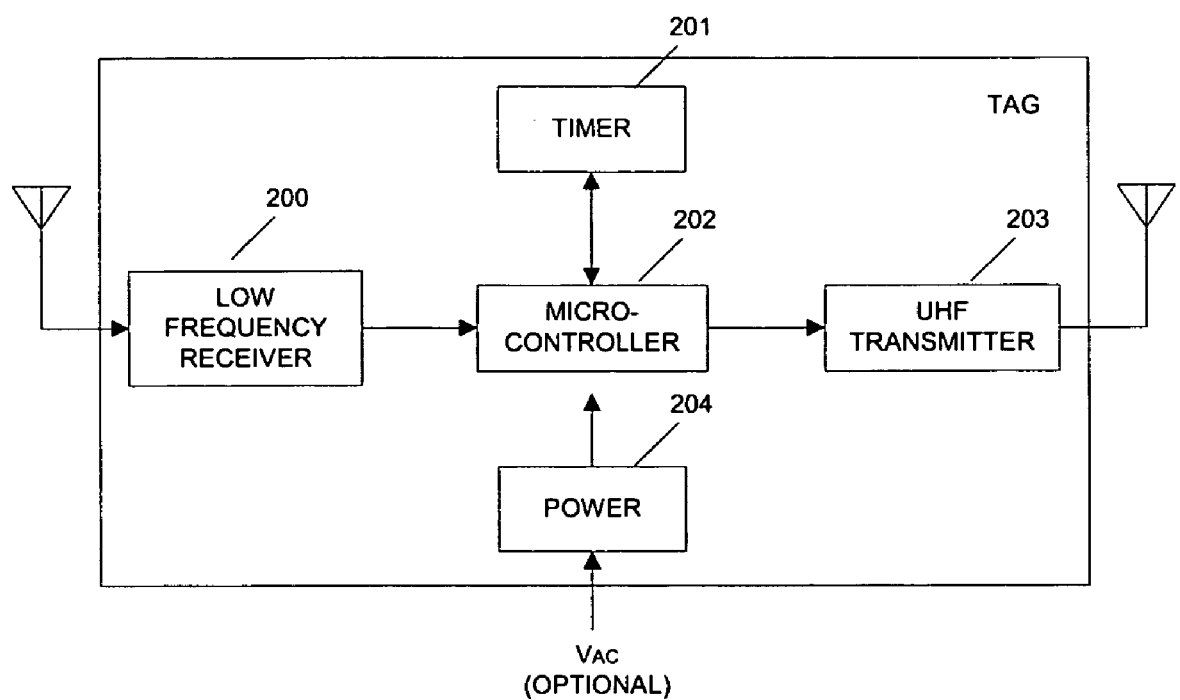
FIG. 2 is a schematic diagram of a prior art RFID tag.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 3:
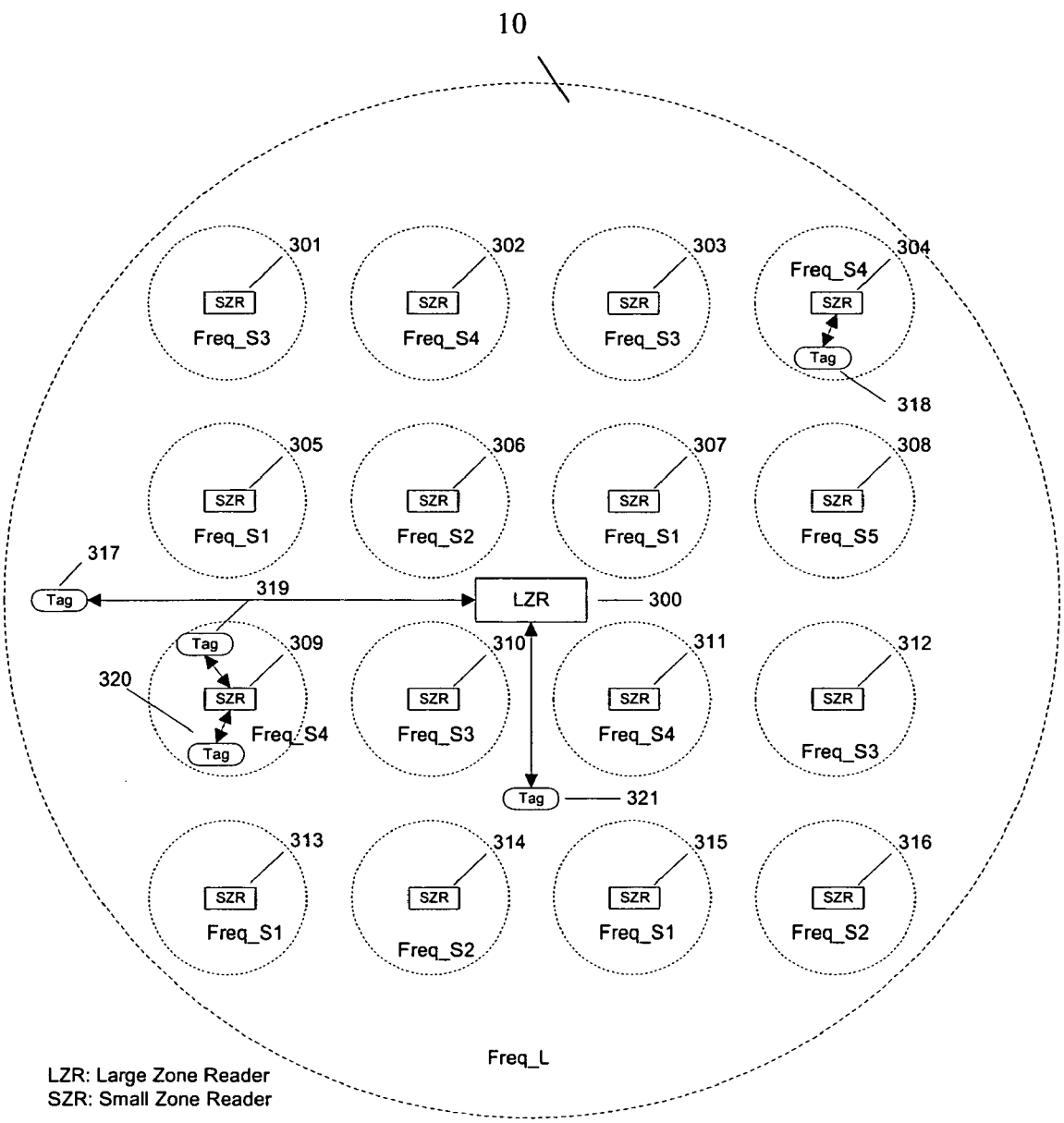
FIG. 3 is a schematic diagram of a RFID system using multiple frequencies in accordance with the teachings of the present invention.

FIG. 3 is a schematic diagram of RFID system 10 in accordance with the teaching of the present invention. RFID system 10 uses a large-zone RFID reader 300 and a plurality of small-zone RFID readers 301–316 cover a large area. A RFID tag and a RFID reader go through an association process, in which both the RFID tag and RFID reader send their identification (ID) numbers to each other and the RFID reader establishes a record that the RFID tag is currently connected to it. In the present invention, one or more active RFID tags 317–321 first try to become associated with small-zone RFID readers 301–316. The one or more active RFID tags 317–321 which cannot become associated with small-zone RFID readers 301–316 are associated with large-zone RFID reader 300. Accordingly, in the example shown in FIG. 3, active RFID tag 318 is associated with small-zone RFID reader 304. Active RFID tags 319 and 320 are associated with small-zone RFID reader 309. Active RFID tags 317 and 321 cannot be associated with any small-zone RFID reader 301–316 and are associated with large-zone RFID reader 300. Large-zone RFID reader 300 only handles active RFID tags 317 and 321 which are not covered by any small-zone RFID reader 301–316. Large-zone RFID reader 300 and small-zone RFID readers 301–316 can simultaneously operate using multiple frequencies providing improved overall system throughput and reliability. In a multiple-frequency environment, the frequencies Freq_S1–Freq_S5 of the RFID readers 300–316 are selected according to a frequency plan in which all the readers adjacent to each other use different frequencies. A user can locate an active RFID tag based on its association with a specific small-zone RFID reader 301–316.

Figure 4:
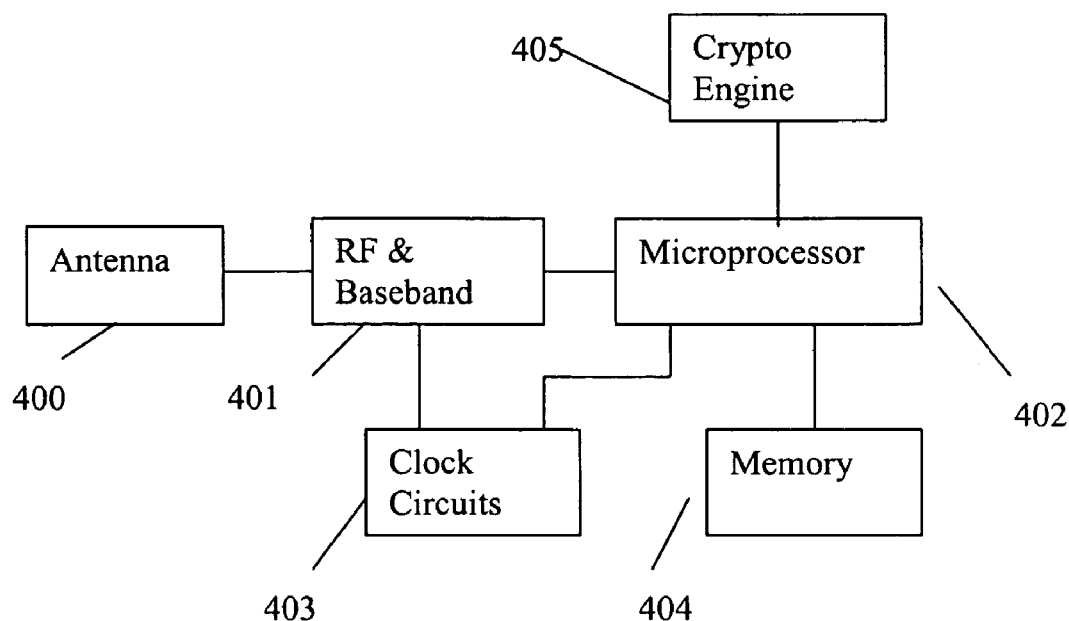
FIG. 4 is a schematic diagram of a hardware block diagram of a RFID tag.

FIG. 4 is a hardware block diagram of an embodiment of RFID tags 317–321 which comprise antenna 400, RF and baseband circuits 401, microprocessor 402, clock circuits 403, one or more memory devices 404, and crypto engine 405. Crypto engine 405 is a hardware circuit that performs calculation of encryption and decryption algorithms.

Figure 5:
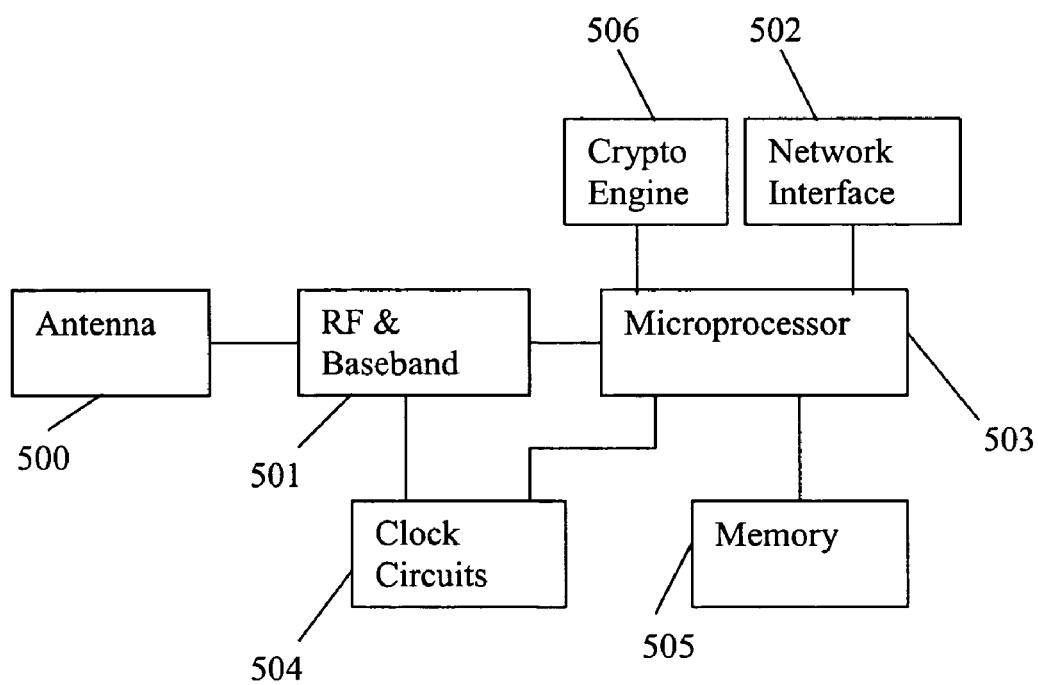
FIG. 5 is a schematic diagram of a hardware block diagram of a RFID reader.

FIG. 5 is a typical hardware block diagram of an embodiment of small-zone and large-zone RFID readers 300–316, which comprise antenna 500, RF and baseband circuits 501, microprocessor 503, clock circuits 504, memory 505, crypto engine 506, and network interface 502.

Figure 6:
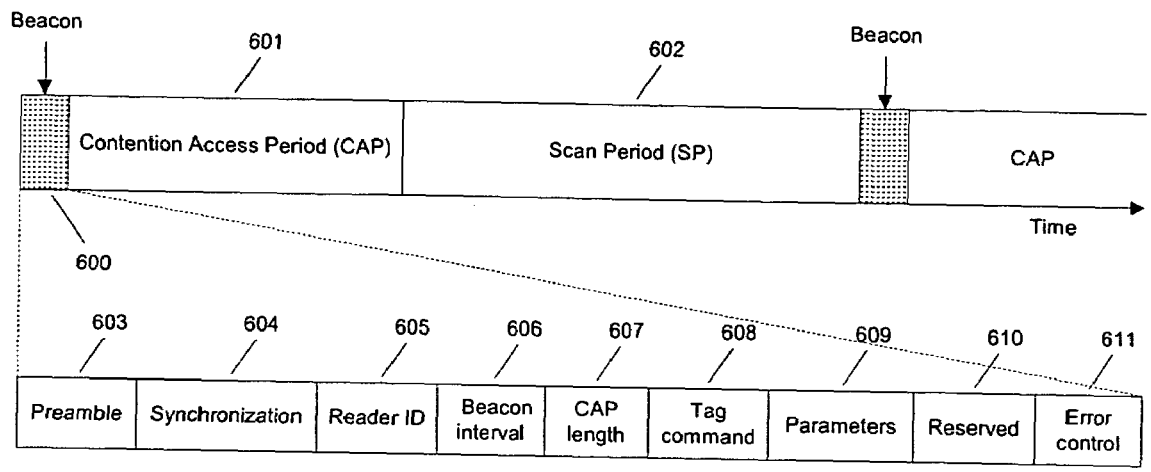
FIG. 6 is a schematic diagram of a frame structure used in the RFID reader.

FIG. 6 is a schematic diagram of a frame structure for the small-zone and large-zone readers, which includes an embodiment of beacon period 600, contention access period (CAP) 601, and scan period (SP) 602. A beacon frame structure comprises several fields including preamble 603, synchronization 604, RFID reader ID 605, beacon interval 606, CAP length 607, tag command 608, parameters 609, reserved field 610, and error control 611. Reserved field 610 is available for other uses. During a scan period, small-zone RFID readers 301–316 scan different frequency channels for RFID tag transmitting signals to make a association to one or more active RFID tags 317–321. After one or more active RFID tags are associated with a small-zone RFID reader, the active RFID tags stop sending signals to make a association and only communicate with the associated RFID reader during the contention access period (CAP) 601. Referring to FIG. 3, RFID tags 317–320 can move between different locations. After RFID tags 318–320 are associated with respective RFID readers 304 and 309, RFID tags 318–320 stop sending repetitive signals and only communicate with respective RFID readers 304 and 309.

Figure 7:
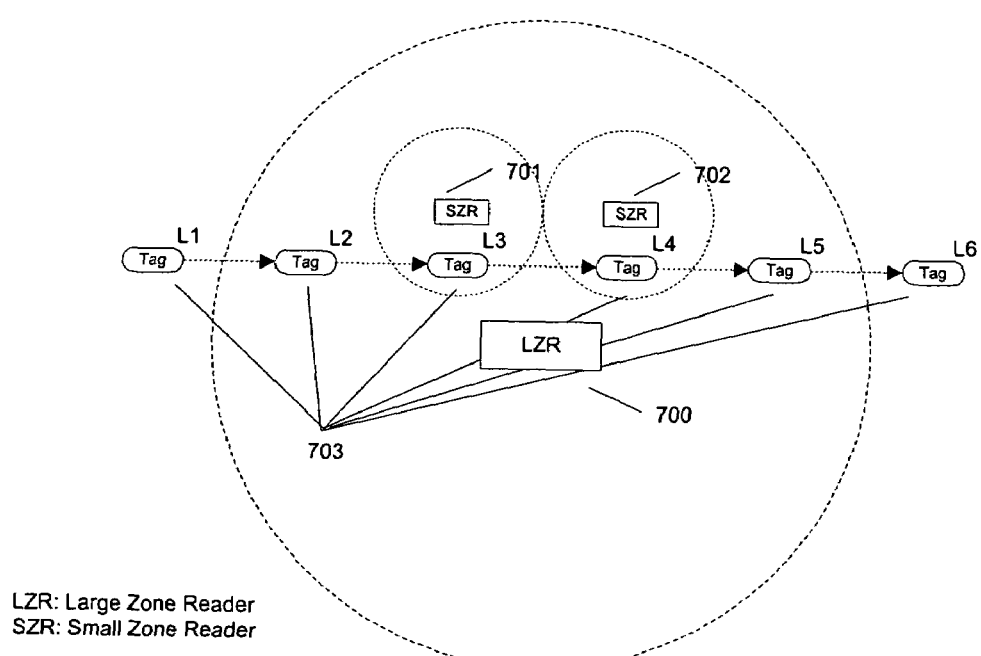
FIG. 7 is a schematic diagram of a RFID tag moving from location L1 to location L6 by going through different RFID reader zones.

FIG. 7 shows active RFID tag 703 which moves from location L1 to location L6 by going through different coverage areas of large-zone RFID reader 700 and small-zone RFID readers 701–702. Active RFID tag 703, large-zone RFID reader 700 and small-zone RFID readers 701–702 can have similar configurations as respective active RFID tags 317–321, large-zone RFID reader 300 and small-zone RFID readers 301–316, as described above.

Figure 8:
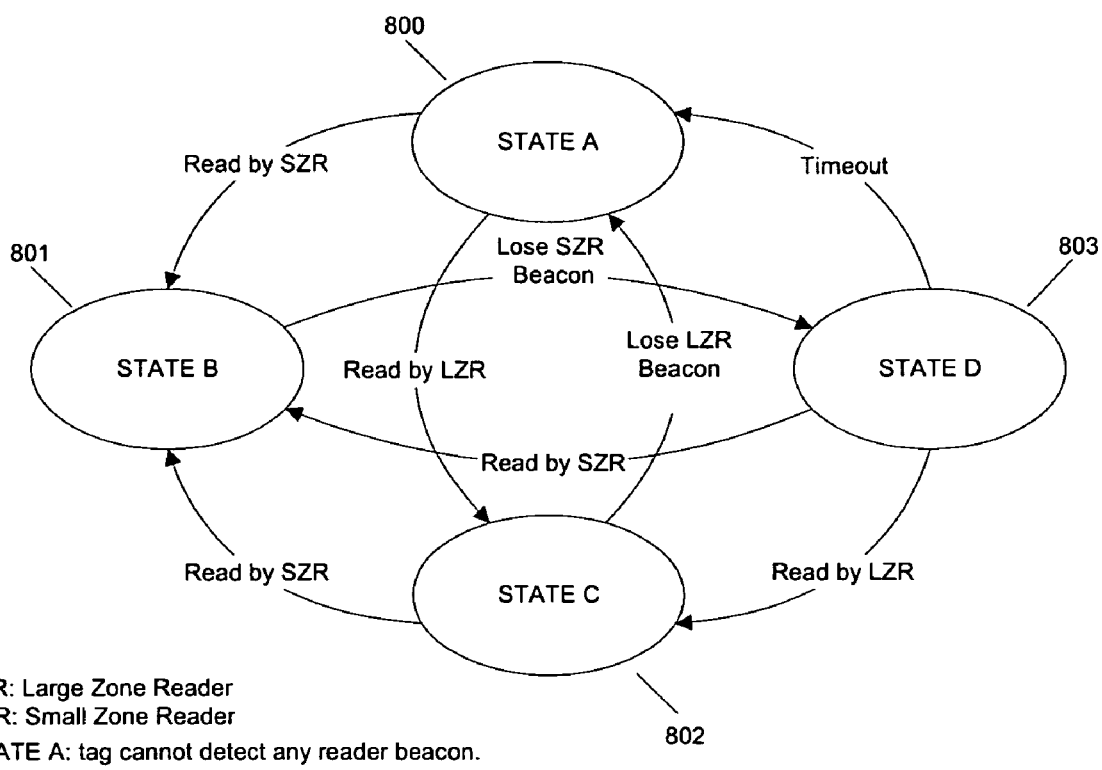
FIG. 8 is a state diagram of a RFID tag state for zone transitions.

FIG. 8 is a RFID tag state diagram for zone changes shown in FIG. 7. In STATE A, active RFID tag 703 cannot detect any reader beacon or reader acknowledgement (ACK). In STATE B, active RFID tag 703 is associated with SZR. In STATE C, active RFID tag 703 is associated with LZR. In STATE D, active RFID tag 703 loses its SZR reader beacon. At location L1 active RFID tag 703 remains in STATE A 800 when it cannot detect any beacon or ACK of a RFID reader. At location L2, active RFID tag 703 is scanned and becomes associated with large-zone RFID reader 700 and active RFID tag 703 goes to STATE C 802.

At location L3, active RFID tag 703 enters STATE B 801 because it is associated with small-zone RFID reader 701. When active RFID tag 703 moves from location L3 to location L4, active RFID tag 703 first goes to STATE D 803 because of the loss of beacons from small-zone RFID reader 701 and then enters STATE B 801 after small-zone RFID reader 702 reads active RFID tag 703. There is a possibility that active RFID tag 703 loses RFID reader 701 beacons and is not detected by RFID reader 702 for a long period of time. In this case, active RFID tag 703 moves to STATE A 800 first and then STATE B 801. When active RFID tag 703 moves from location L4 to location L5, it first goes to STATE D 803 because of the loss of beacons from small-zone RFID reader 702 and then enters STATE C 802 after large-zone RFID reader 700 reads active RFID tag 703. Finally, active RFID tag 703 goes back to STATE A when active RFID tag 703 is outside the coverage areas of all of RFID readers 700–702.

Figure 9:
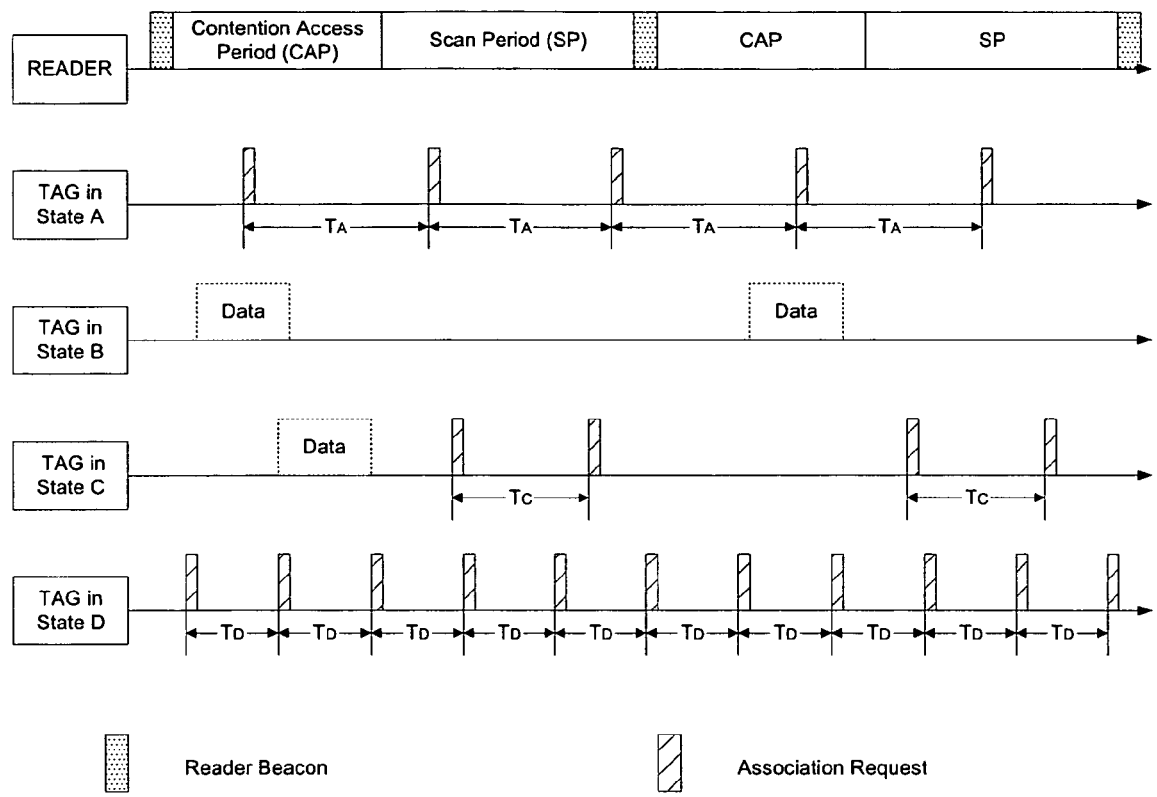
FIG. 9 is a schematic diagram showing the signaling and communication operations for RFID tags in different states.

FIG. 9 is a schematic diagram showing the signaling and communication operations for active RFID tag 703 in different states described in FIG. 7 and FIG. 8. In STATE A 800, active RFID tag 703 sends a repetitive signal for every $T_A$ period because it cannot detect any RFID reader beacon or ACK. Typically $T_A$ is selected to be the longest, repetitive time period for providing power-savings. In STATE B 801, active RFID tag 703 is associated with small-zone RFID reader 701 or 702. In STATE B 801, active RFID tag 703 stops sending any repetitive signals and communicates with RFID reader 701 or 702 only at the contention access period 601, shown in FIG. 6. In FIG. 9, in STATE C 802, active RFID tag 703 communicates with the large-zone RFID reader 700 in contention access period 601 and sends a repetitive signal for every time period $T_C$ in scan period 602 to allow active RFID tag 703 to be read by small-zone RFID reader 701 or 702. In STATE D 803, active RFID tag 703 sends a repetitive signal for every time period $T_D$ because active RFID tag 703 cannot detect the beacons sent by small-zone RFID reader 701 or 702 that were previously associated with active RFID tag 703.

Figure 10:
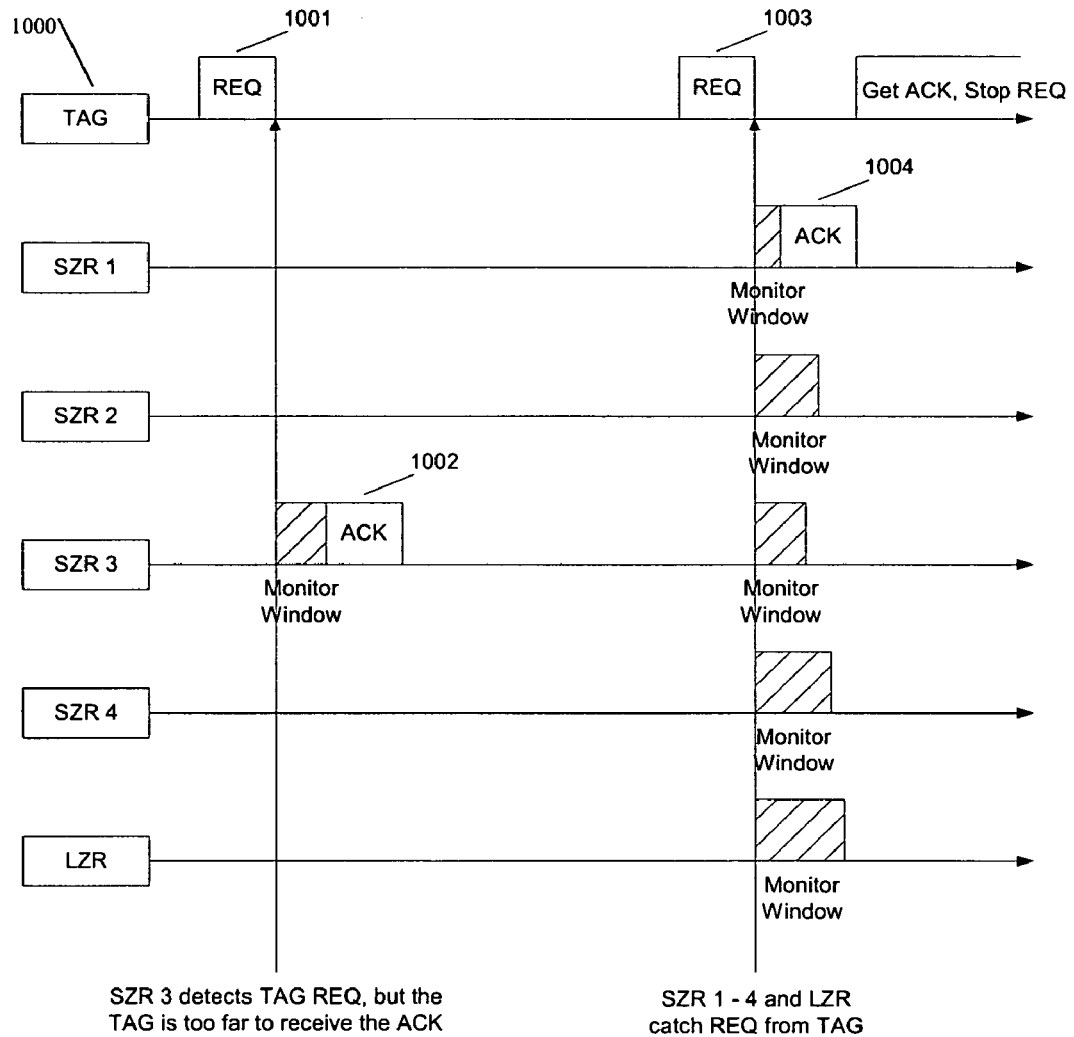
FIG. 10 is a timing diagram for different RFID readers operating in a scan period.
Figure 10:
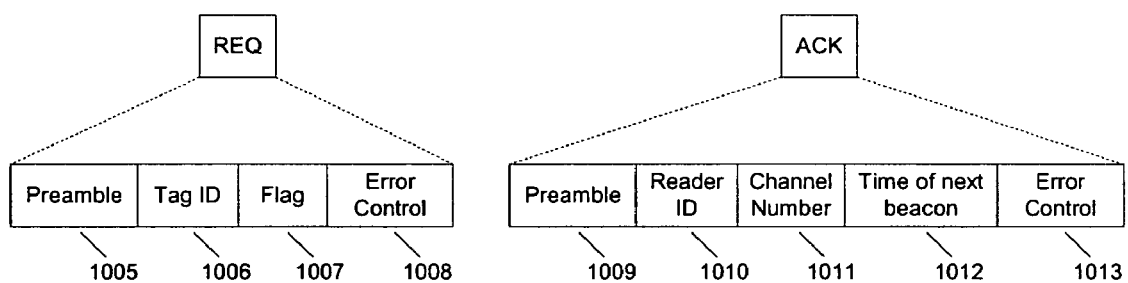

FIG. 10 is a timing diagram for different RFID readers 301–306 operating in scan period 602. Active RFID tag 1000 sends out signaling packet 1001 to request association with any of small-zone RFID readers SZR1–SZR4 and large-zone RFID reader LZR. Although small-zone RFID reader SZR3 detects signaling packet 1001 and sends acknowledge (ACK) packet 1002, active RFID tag 1000 fails to receive ACK packet 1002 because it is too far away from RFID reader SZR3, and, hence, active RFID tag 1000 sends another signaling packet 1003. If small-zone RFID readers SZR1–SZR4 can all detect packet 1003, then each reader will listen to the channel for a monitoring window that is inversely proportional to received signal strength indicator (RSSI) before sending an ACK packet 1004. Typically, the monitoring widow of the large-zone reader (LZR) is greater than any monitoring window of the small-zone reader (SZR). In this example, small-zone RFID reader SZR1 has the strongest RSSI, so it has the shortest monitor window before sending ACK packet 1004. This approach improves the probability that the closest small-zone RFID reader SZR1 is the first one to send ACK packet 1002 or 1004. A typical request (REQ) packet 1001 or 1003 comprises several fields including preamble 1005, tag ID 1006, flag 1007, and error control 1008. A typical ACK packet 1002 or 1004 includes several fields, such as preamble 1009, reader ID 1010, RFID reader's channel number 1011, time for the next reader beacon 1012, and error control 1013. Active RFID tag 1000 uses reader's channel number 1011 and time of next beacon 1012 to go to small-zone RFID reader SZR1 beacon channel for completing the association process.

Figure 11:
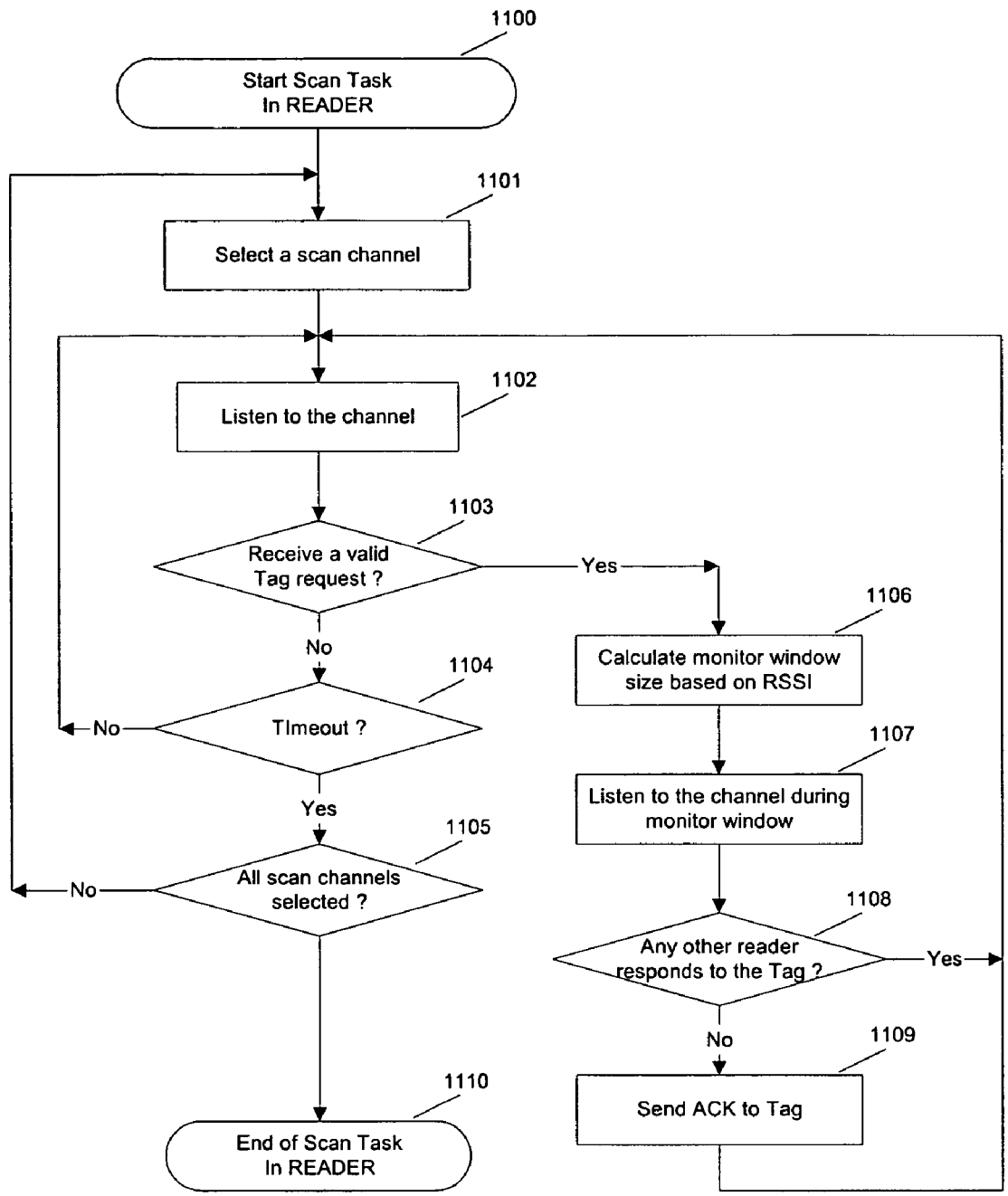
FIG. 11 is a flow chart of a RFID reader's scan task.

FIG. 11 is a flow chart for a RFID reader's scan task. The scan task starts from Step 1100 and selects a scan channel in Step 1101. The task listens to the scan channel in Step 1102 and checks if a valid tag request has been received in Step 1103. If there is a valid tag request, the task calculates the monitoring window based on received signal strength indicator (RSSI) in Step 1106. In step 1107, the task listens to the channel during a monitoring window. If there is another reader responding to the tag in Step 1108, the task then goes back to Step 1102 to listen to the channel again. Alternatively, if there is not another reader responding to the tag, the task sends an ACK packet to the tag in Step 1109. In Step 1103, if no valid tag request occurred, the task checks the channel timeout in Step 1104. If there is no timeout, the task goes back to Step 1102 to listen to the same channel. Alternatively, if there is a time out, the task goes to Step 1105 to check whether all the channels have been scanned. If all the channels have been scanned, the task stops in Step 1110. Alternatively, if all the channels have not been scanned, the task goes to Step 1101 to select a new channel to scan.

Figure 12:
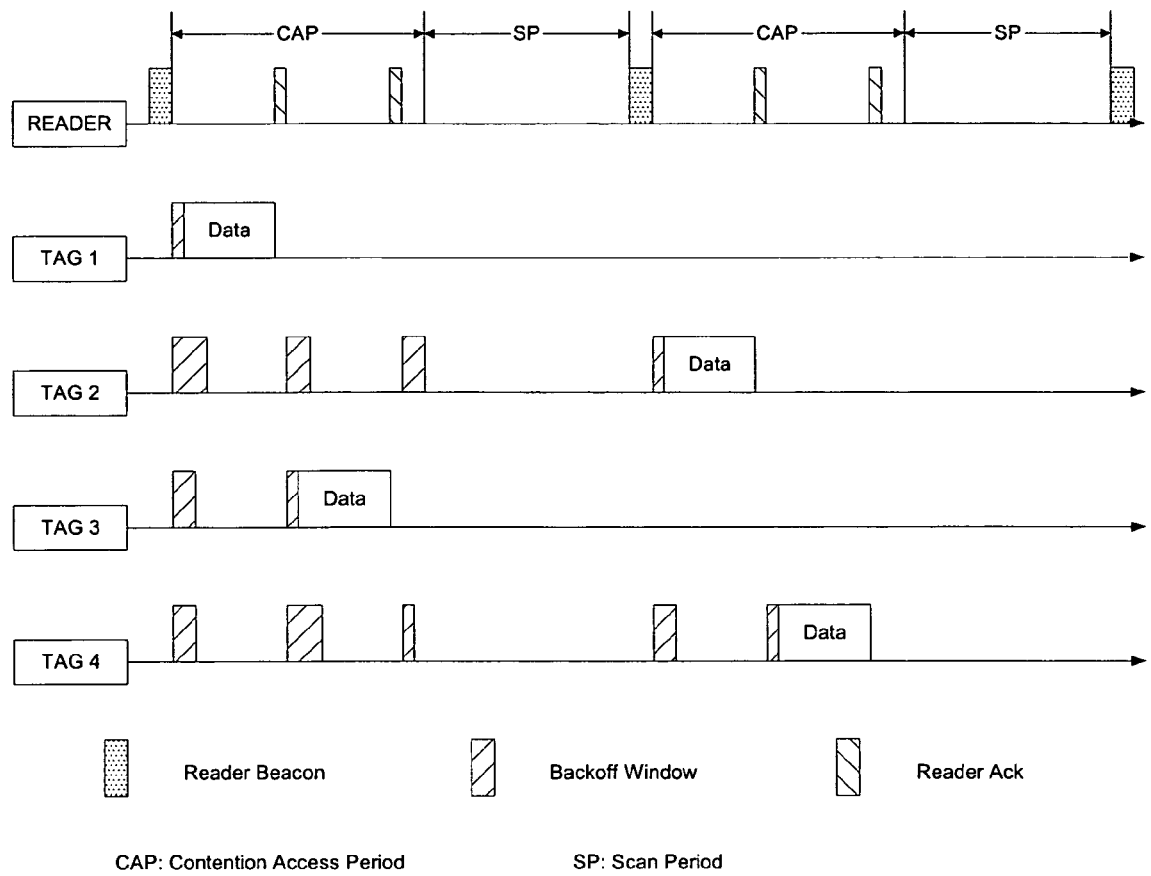
FIG. 12 is a schematic diagram of a RFID tag and RFID reader operations in a contention access period.

FIG. 12 is a schematic diagram of an active RFID tag and RFID reader operation in contention access period 601 in which the active RFID tags use a listen-before-talk approach to communicate with a RFID reader. After receiving a RFID reader beacon packet, each active RFID tag TAG1–TAG4 checks whether it needs to respond to the RFID reader based on the beacon's tag command 608 and parameter 609 fields, as shown in FIG. 6, or a tag-initiated event. If the RFID tag needs to respond, the active RFID tag waits for a randomly generated backoff window before sending a data packet to the RFID reader.

Figure 13:
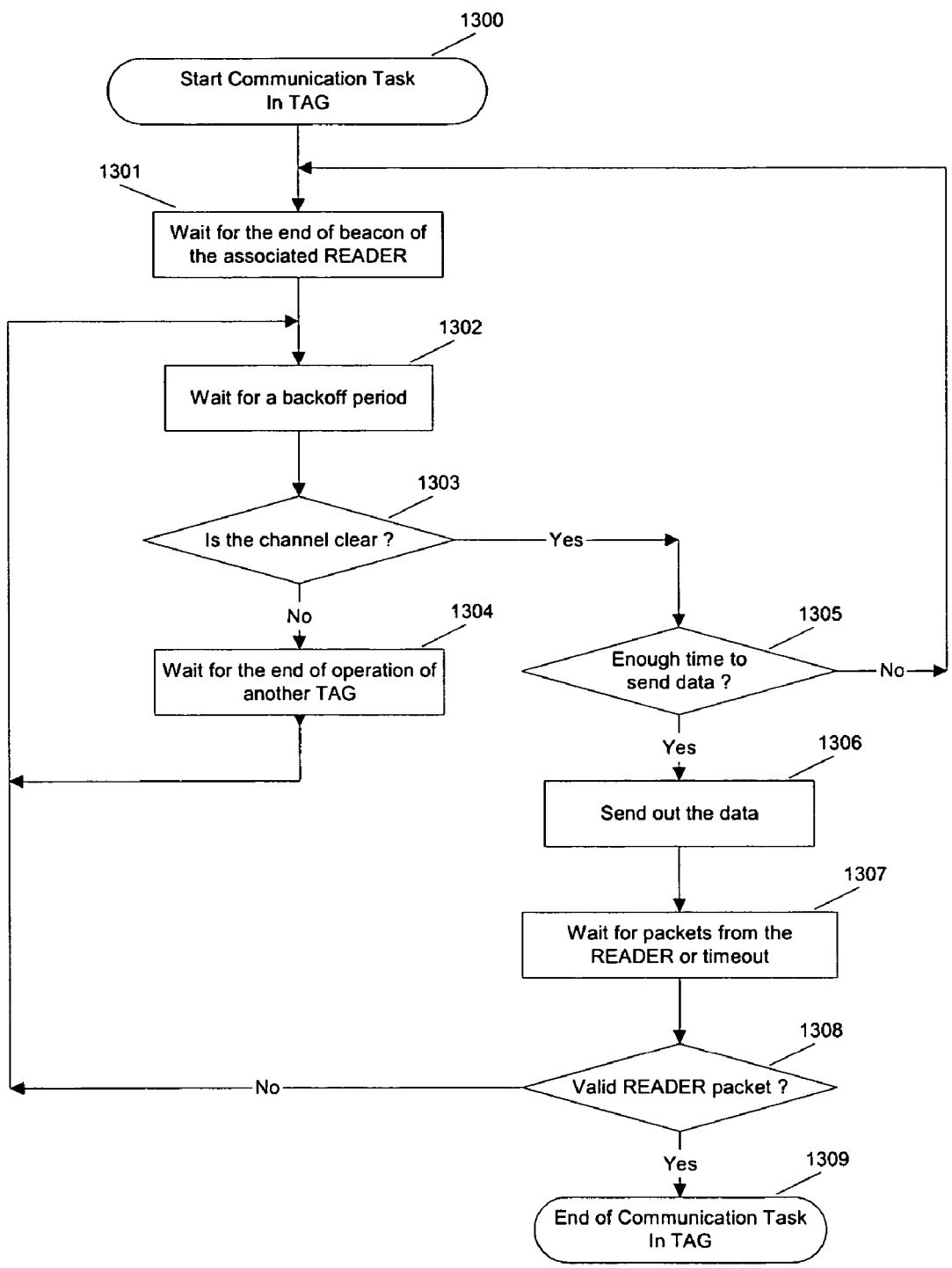
FIG. 13 is a flow chart for a RFID tag's communication task in a contention access period.

FIG. 13 is a flow chart of a RFID tag's communication task in contention access period 601. The task is initiated from Step 1300 when the RFID reader is trying to talk to the active RFID tag using the beacon's tag command 608 and parameter 609 fields or the active RFID tag has internal or external events needed to be reported to the RFID reader. The task waits for the beacon to end in Step 1301 and a backoff window in Step 1302. If the channel is clear in Step 1303, the task goes to Step 1305 and checks whether there is enough time to send a data packet before the end of contention access period 601. If there is not enough time to send a data packet, the tasks go back to Step 1301. If there is enough time to send a data packet, the task sends out the data packet in Step 1306. The task waits for a response packet from the RFID reader in Step 1307. In Step 1308, the task checks the validity of the RFID reader packet. If the RFID reader packed is valid, the task ends in Step 1309. If the RFID reader packed is not valid, the task goes to Step 1302. If the channel is not clear in Step 1303, the task waits for another active RFID tag to complete its operation in Step 1304 before going to Step 1302.

Figure 14:
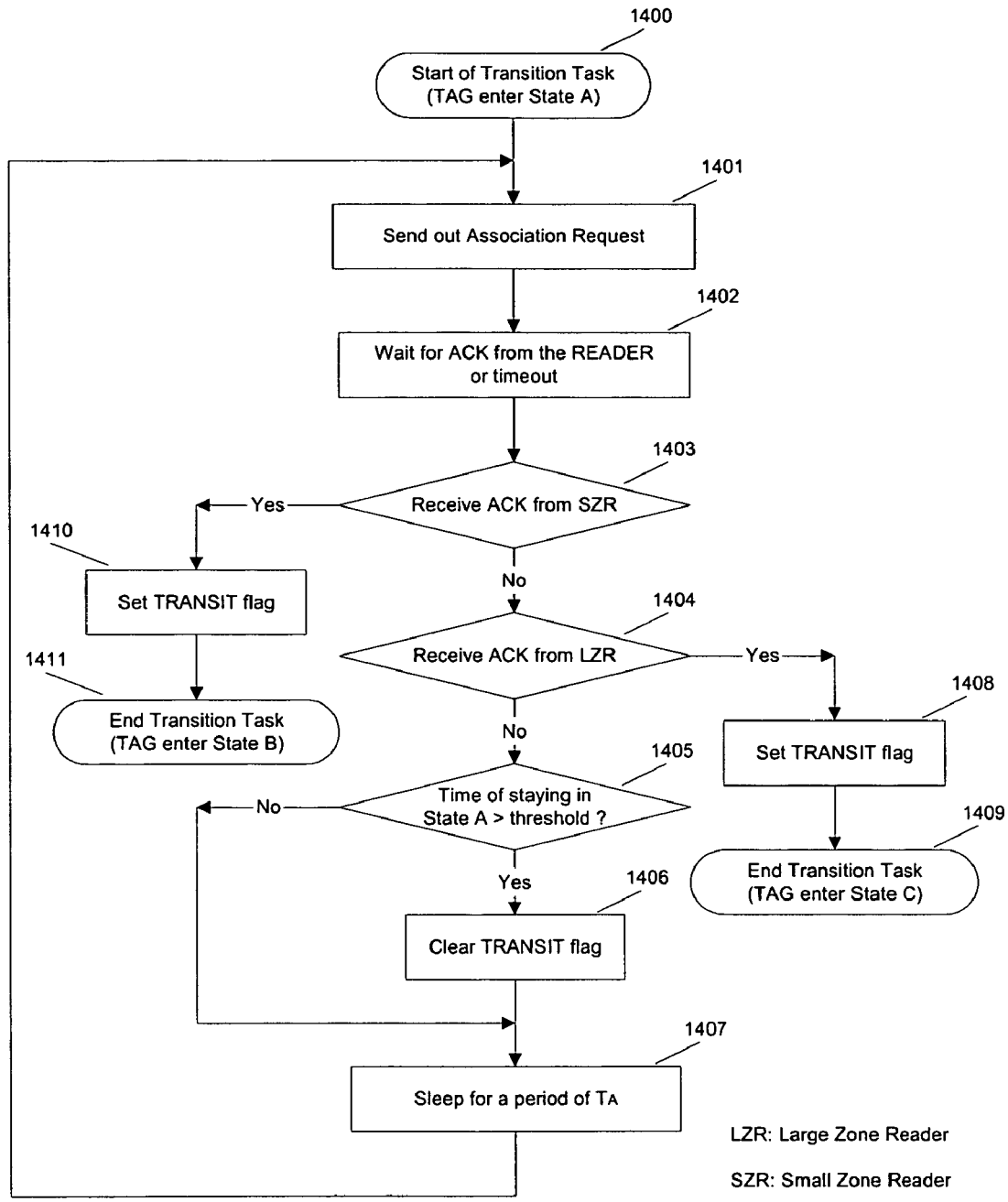
FIG. 14 is a flow chart for a RFID tag's state transition task in STATE A.

FIG. 14 is a flow chart for a RFID tag's transition task in State A 800. The task starts from Step 1400. The task sends out an association request in Step 1401. The task waits for an ACK packet from the reader or a timeout in Step 1402. If the task receives a small-zone RFID reader ACK packet in Step 1403, it sets a TRANSIT flag in Step 1410 and ends the task in Step 1411 at which the active RFID tag moves to State B 801. If the task receives a large-zone RFID reader ACK packet in Step 1404, it sets a TRANSIT flag in Step 1408 and ends the task in Step 1409 in which the task moves to State C 802. If no ACK packet is received in Step 1403 and Step 1404, the task checks whether the time that the task stays in State A 800 is greater than a predetermined threshold in Step 1405. If the time in State A is greater than a predetermined threshold, the task clears the TRANSIT flag in Step 1406. If the time in State A is not greater than a predetermined threshold, the task goes to Step 1407 to sleep for a $T_A$ period before going back to Step 1401.

Figure 15:
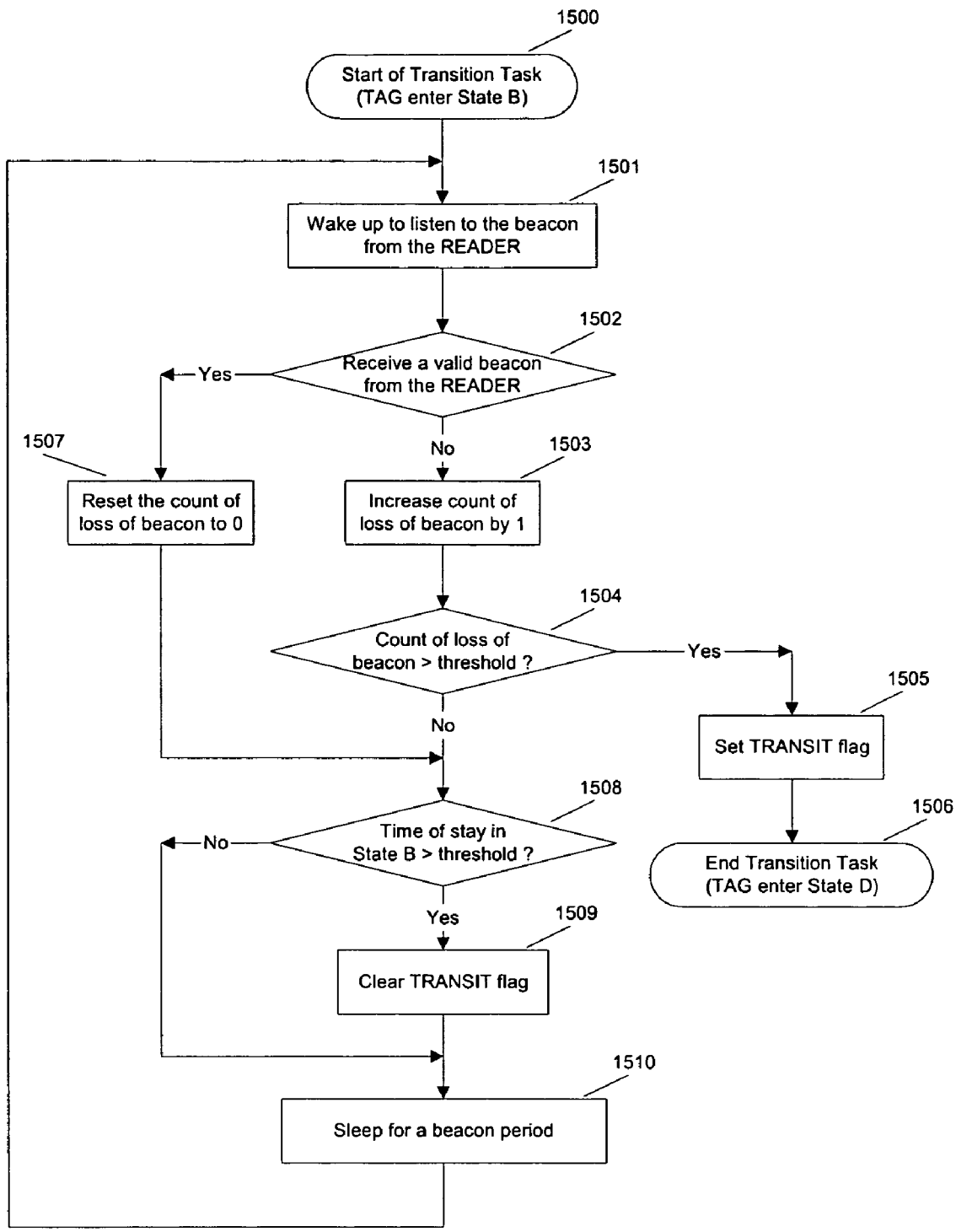
FIG. 15 is a flow chart for a RFID tag's state transition task in STATE B.

FIG. 15 is a flow chart for a RFID tag's transition task in State B 801. The task starts from Step 1500 and wakes up to listen to the RFID reader beacon in Step 1501. If the task receives a valid RFID reader beacon in Step 1502, it resets the count of loss of a beacon to zero in Step 1507. Alternatively, if the task does not receive a valid beacon from the RFID reader, the task increases the count of loss of a beacon by one in Step 1503. The task checks whether the count of beacon loss is greater than a threshold in Step 1504. If the count of a beacon loss is greater than a threshold, the task sets TRANSIT flag in Step 1505 and ends in Step 1506 where the RFID tag moves to State D 803. If the count of a beacon loss is not greater than a threshold, the task checks whether the time that it stays in State B 801 is greater than another threshold in Step 1508. If the time that it stays in State B 801 is greater than another threshold, the task clears the TRANSIT flag in Step 1509. If the time that it stays in State B 801 is not greater than another threshold, the task goes to Step 1510 to sleep for a beacon period before going back to Step 1501.

Figure 16:
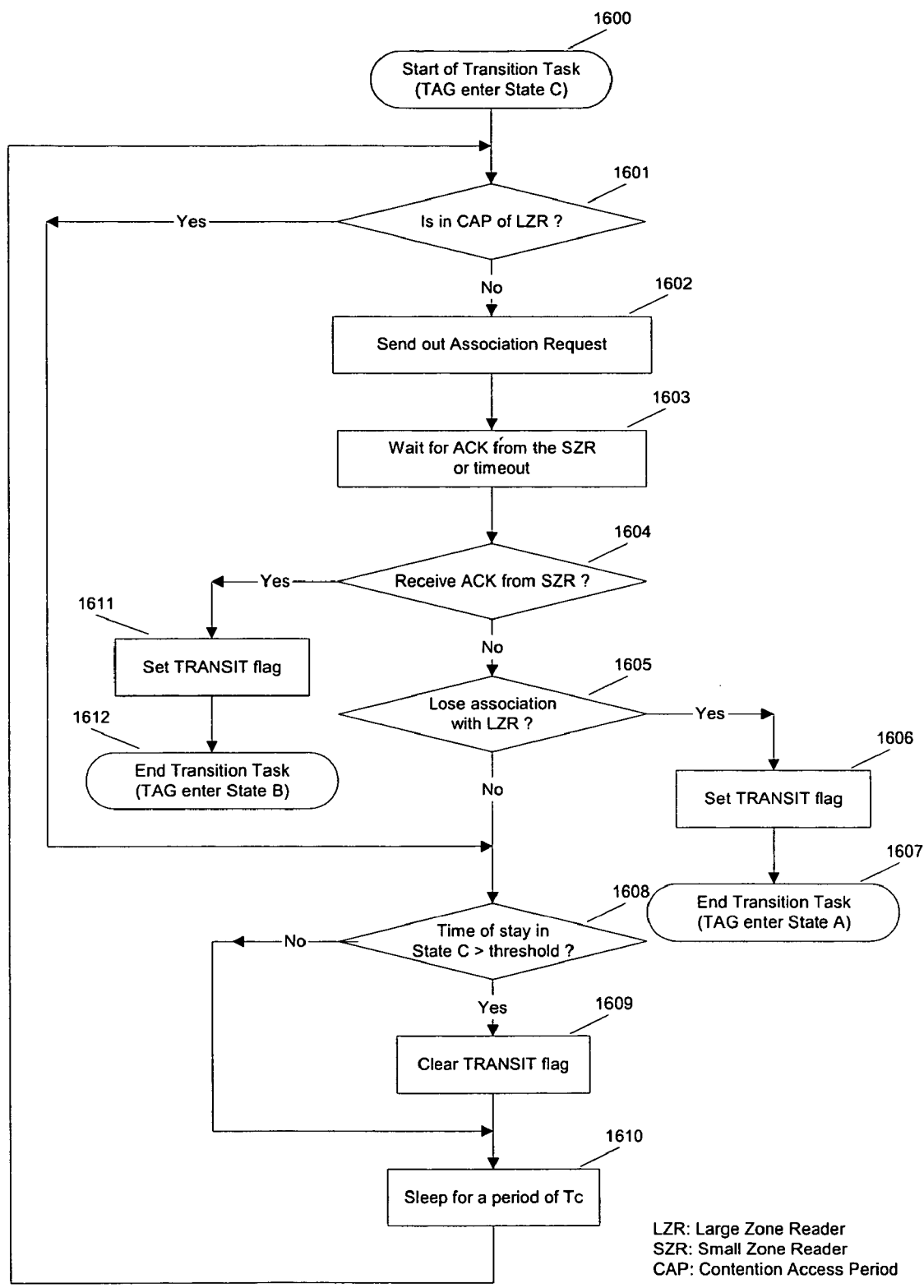
FIG. 16 is a flow chart for a RFID tag's state transition task in STATE C.

FIG. 16 is a flow chart for a RFID tag's transition task in State C 802. The task starts from Step 1600 and checks whether it is in the contention access period 601 of the large-zone RFID reader in Step 1601. If the task is not in the contention access period 601 of the large-zone RFID reader 300, the task sends out an association request in Step 1602 and waits for an ACK packet from the small-zone RFID reader 301–316 or a timeout in Step 1603. If the task receives a small-zone RFID reader ACK packet in Step 1604, the task sets a TRANSIT flag in Step 1611 and ends the task in Step 1612 in which the RFID tag moves to State B 801. If the task does not receive a small-zone RFID reader ACK packet, the task checks whether it loses the association with the large-zone RFID reader in Step 1605. If the task loses the association with the large-zone RFID reader, the task sets the TRANSIT flag in Step 1606 and ends in Step 1607 in which the tag moves to State A 800. If the task does not lose the association with the large-zone RFID reader, the task checks whether the time that it stays in State C 802 is greater than a threshold in Step 1608. If the time that it stays in State C 802 is greater than a threshold, the task clears the TRANSIT flag in Step 1609. If the time that it stays in State C 802 is not greater than a threshold, the task goes to Step 1610 to sleep for a $T_C$ period before going back to Step 1601.

Figure 17:
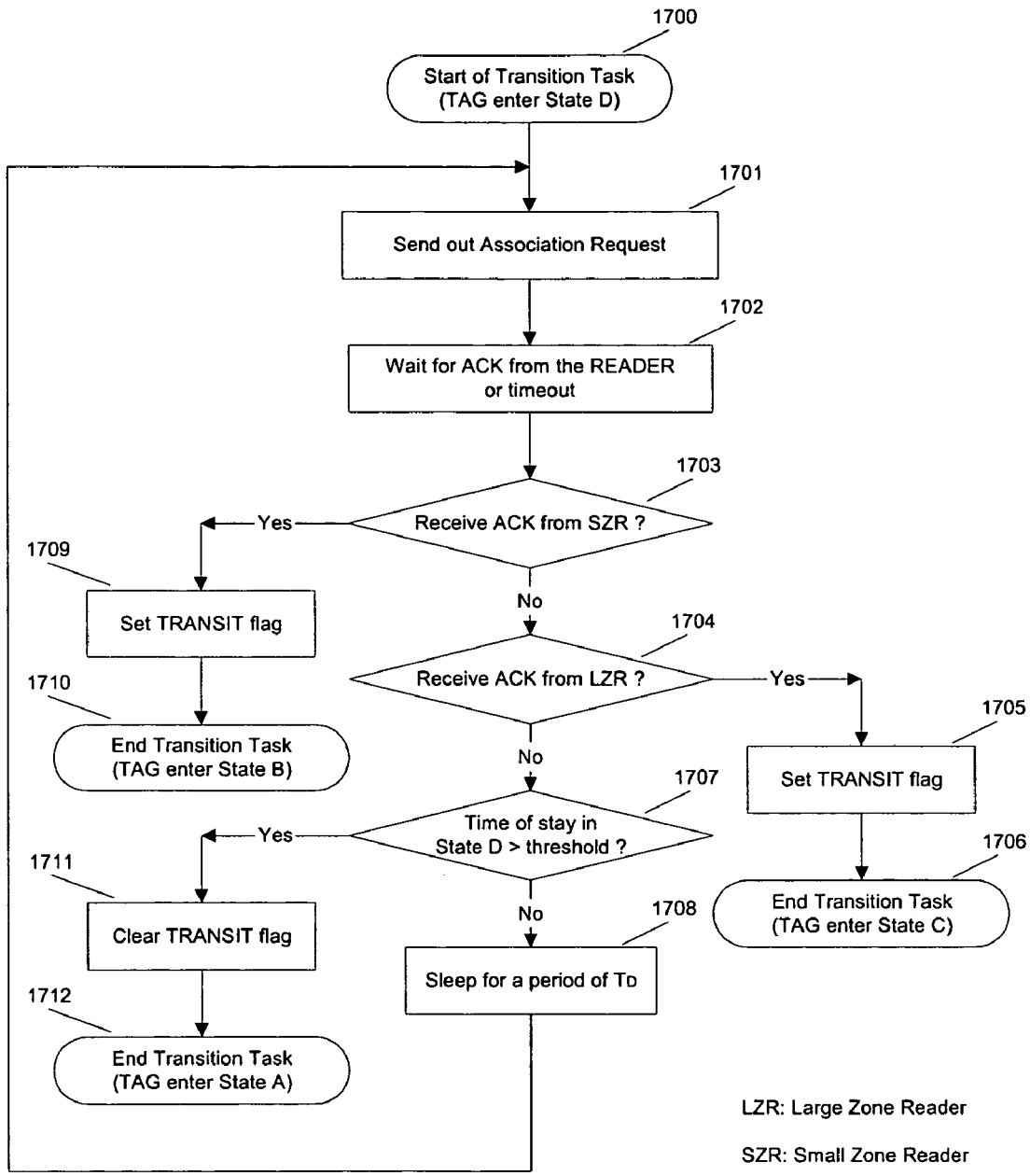
FIG. 17 is a flow chart for a RFID tag's state transition task in STATE D.

FIG. 17 is a flow chart for an active RFID tag's transition task in State D 803. The task starts from Step 1700 and sends out an association request in Step 1701. The task waits for an ACK packet from the RFID reader or a timeout in Step 1702. If the task receives a small-zone RFID reader ACK packet in Step 1703, it sets a TRANSIT flag in Step 1709 and ends the task in Step 1710 in which the RFID tag moves to State B 801. If the task receives a large-zone RFID reader ACK packet in Step 1704, it sets a TRANSIT flag in Step 1705 and ends the task in Step 1706 in which the task moves to State C 802. If no ACK packet is received in Step 1703 and Step 1704, the task checks whether the time that it stays in State D 803 is greater than a predetermined threshold in Step 1707. If the time that it stays in State D 803 is greater than a predetermined threshold, the task clears the TRANSIT flag in Step 1711 and ends the task in Step 1712 where the RFID tag moves to State A 800. If the time that it stays in State D 803 is not greater than a predetermined threshold, the task goes to Step 1708 to sleep for a $T_D$ period before going back to Step 1701.

Figure 18:
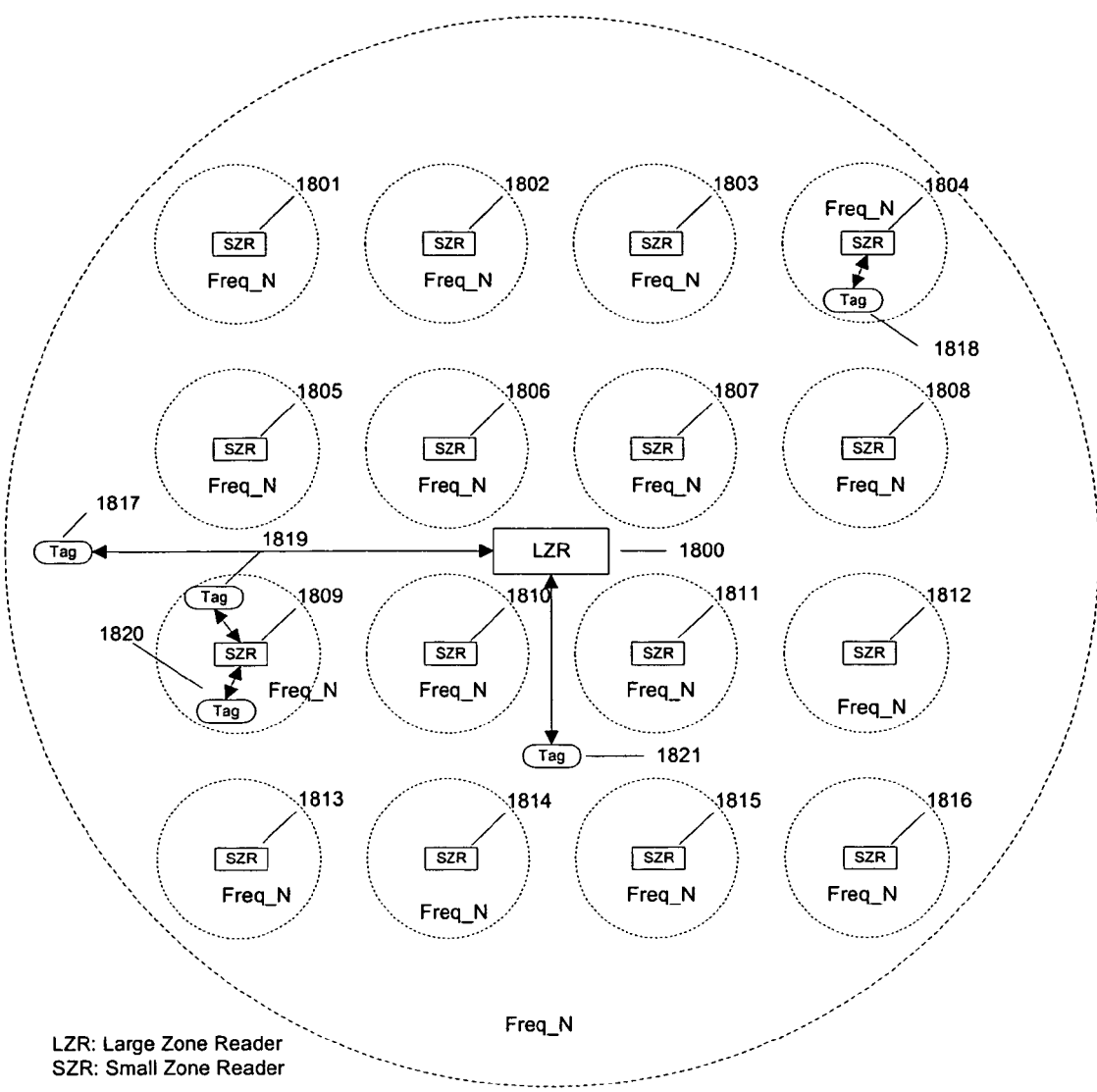
FIG. 18 is a schematic diagram of a RFID system using a single frequency in accordance with the teachings of the present invention.

FIG. 18 is an embodiment of RFID system 1830 using a single frequency in which large-zone RFID reader 1800 and a plurality of small-zone RFID readers 1801–1816 are used to cover a large area. Active RFID tags 1817–1821 first try to be associated with small-zone RFID readers 1801–1816 so that large-zone RFID reader 1800 only handles tags 1817, 1821 that are not covered by any small-zone RFID reader 1801–1816. All of large-zone RFID reader 1800 and small-zone RFID readers 1801–1816 can simultaneously operate using a single frequency by using a time-division approach. A user can locate an active RFID tag based on its association with a specific small-zone RFID reader 1801–1816.

Figure 19:
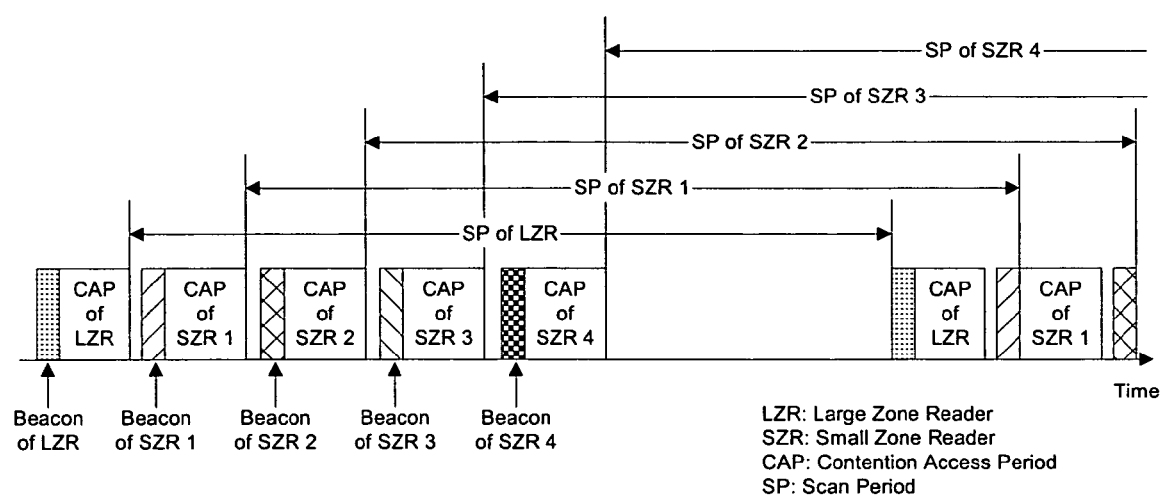
FIG. 19 is a schematic diagram of operations of multiple RFID readers using a single frequency.

FIG. 19 is a schematic diagram of operations of a plurality of RFID readers using a single frequency. As described in FIG. 6, the frame structure of either a large-zone RFID reader or a small-zone RFID reader comprises beacon 600, contention access period 601, and scan period 602. In a single frequency operation, small-zone RFID readers 1801–1816 use the large-zone RFID reader 1800 beacon as a reference to offset their beacon timing by contention access period 601 plus a small random time period, so that the RFID tags can communicate with their associated RFID readers with minimal interference from other RFID tags and RFID readers. For example, the small random time period can be in the range of about 0 microsecond to about 100 microseconds. In this embodiment, the scan period (SP) of the large-zone reader (LZR) is between the end of a first contention access period (CAP) of large-zone RFID reader 1800 and beginning of a second beacon period of large-zone reader (LZR). The scan period of a first small-zone reader (SZR1) is between the end of a first contention access period (CAP) of small-zone reader (SZR1) and beginning of a second beacon period of small zone reader (SZR1).

Figure 20:
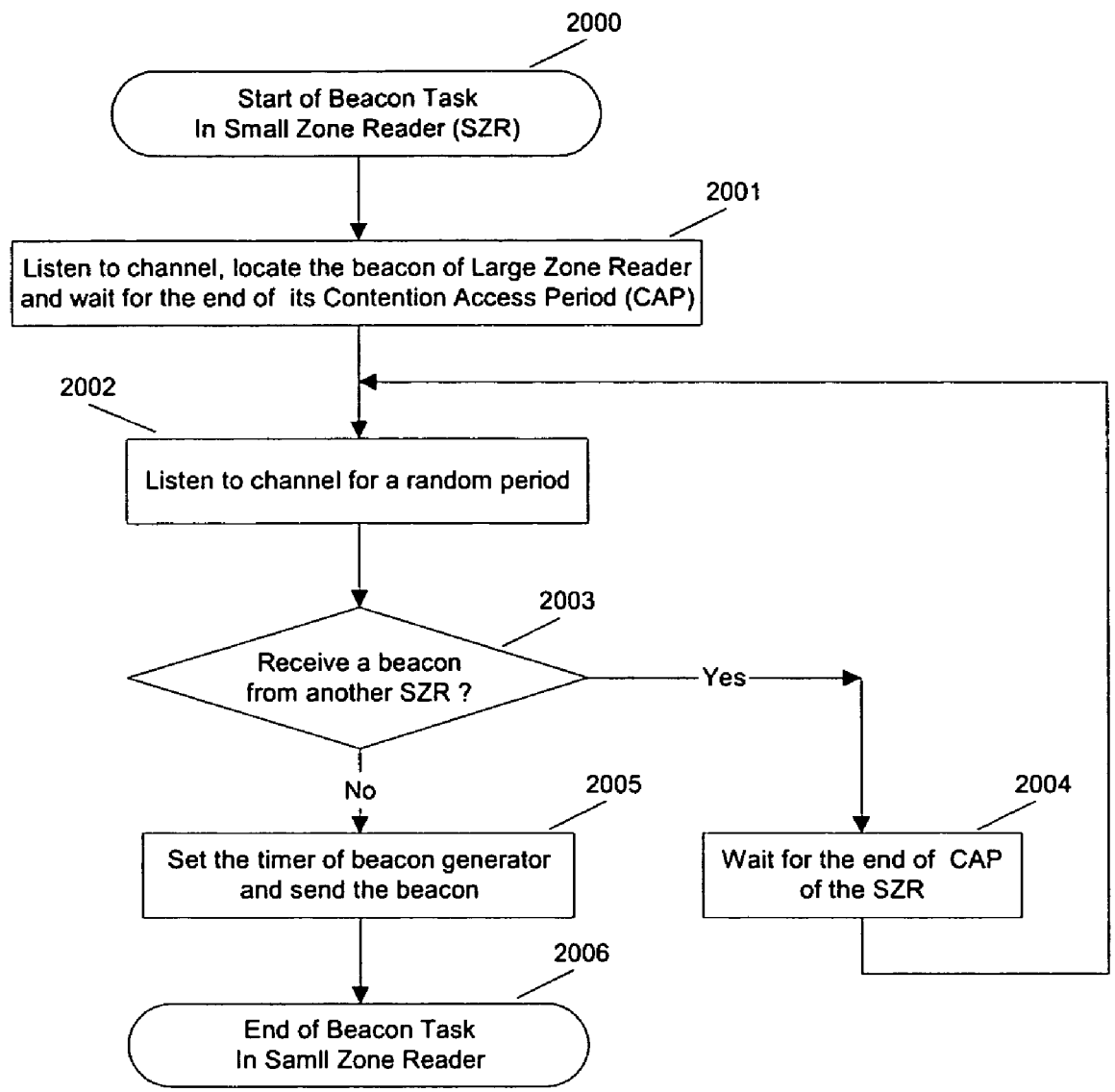
FIG. 20 is a flow chart of a beacon task of a small-zone RFID reader.

FIG. 20 is a flow chart for a beacon task of a small-zone RFID reader in a single-frequency environment. The task starts from Step 2000 and goes to Step 2001 where the task listens to the channel. The task locates the large-zone RFID reader's beacons and waits until the large-zone RFID reader completes its contention access period (CAP) 601. The task listens to the channel for an additional random period in Step 2002 before checking whether there are beacon signals from other small-zone RFID readers in Step 2003. If there are beacon signals from other small-zone RFID readers, the task waits for the end of the CAP of the small-zone RFID reader in Step 2004 and then goes to Step 2002. If there are no beacon signals from other small-zone RFID readers, the task sets the timer for generating its beacon and sends out the beacon packet in Step 2005 and ends in Step 2006.

Figure 21:
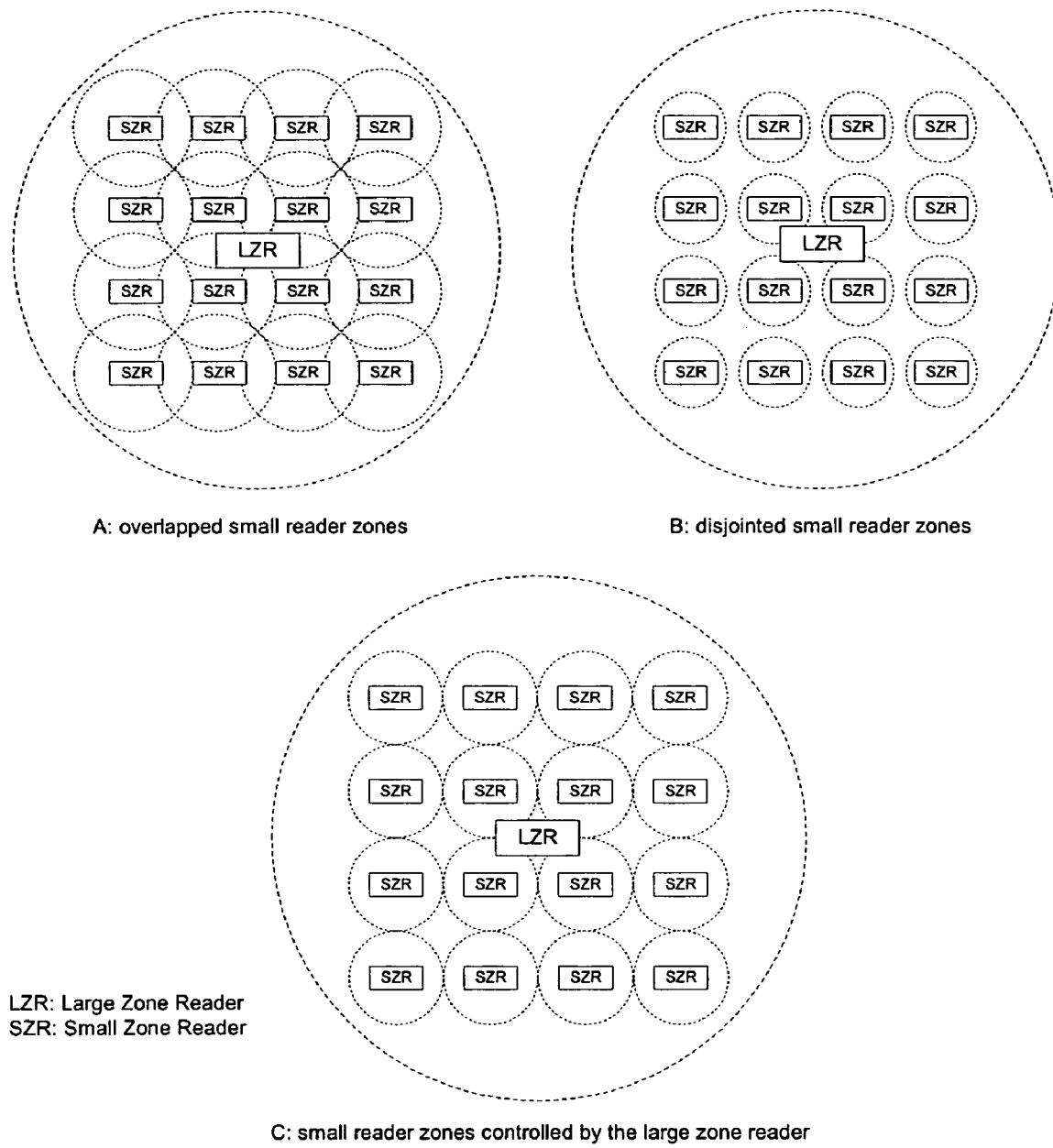
FIG. 21 is a schematic diagram of three different operating areas of small-zone RFID readers.

FIGS. 21A–21C are schematic diagrams showing three different coverage areas for small-zone RFID readers. In an embodiment shown in FIG. 21A, there are large overlapped areas among all the small-zone RFID readers. In this embodiment, most of the active RFID tags are associated with the small-zone RFID readers, and the large-zone RFID reader has little traffic and few associated active RFID tags. In an embodiment shown in FIG. 21B, there are large disjointed areas among all of the small-zone RFID readers. In this embodiment, the large-zone RFID reader handles a large number of active RFID tags. This embodiment can cause throughput and reliability issues. FIG. 21C illustrates control of the small-zone RFID readers by the large-zone RFID readers. The original coverage is shown in FIG. 21B. FIG. 21C illustrates that the large-zone RFID reader requests each of the small-zone RFID readers to increase its radio output power and hence its coverage area until the large-zone RFID reader's traffic and tag association falls below a predetermined high threshold. If the original coverage is shown in FIG. 21A, FIG. 21C illustrates that the large-zone RFID reader requests each of the small-zone RFID readers to reduce its radio output power and hence its coverage area until the large-zone RFID reader's traffic and tag association exceeds a predetermined low threshold.

Figure 22:
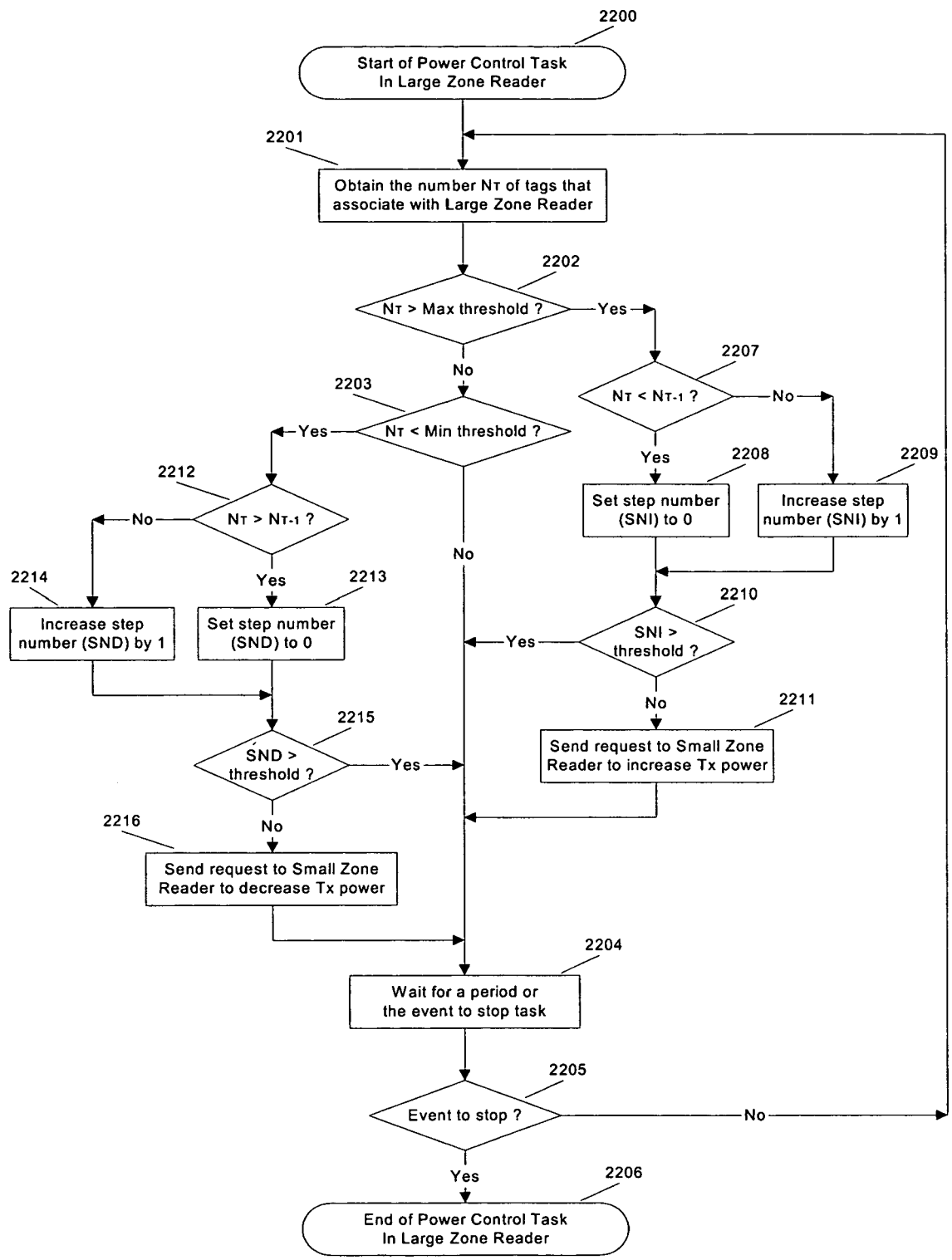
FIG. 22 is a flow chart for the power control task of a large-zone RFID reader.

FIG. 22 is a flow chart for a power control task of a large-zone RFID reader. The task starts from Step 2200 and gets $N_T$, the number of tags associated with the large-zone RFID reader at time T, in Step 2201. If the $N_T$ is greater than a maximum threshold in Step 2202, the task goes to Step 2207 to check whether $N_T$ is less than $N_{T-1}$. If $N_T$ is not less than $N_{T-1}$, the task increases the step number for increment (SNI) by one in Step 2209. If $N_T$ is less than $N_{T-1}$, the task sets the SNI to zero in Step 2208. The task checks whether SNI is greater than a threshold in Step 2210. If SNI is not greater than a threshold, the task sends request to the small-zone RFID readers for increasing their output power. If SNI is greater than a threshold, the tasks goes to Step 2204 where the task waits for a time period for the system to settle into the new adjustment in Step 2204. If the $N_T$ is less than a minimum threshold in Step 2203, the task goes to Step 2212 to check whether $N_T$ is greater than $N_{T-1}$. If $N_T$ is not greater than $N_{T-1}$, the task increases the step number for decrement (SND) by one in Step 2214. If $N_T$ is greater than $N_{T-1}$, the task sets the SND to zero in Step 2213. The task checks whether SND is greater than a threshold in Step 2215. If SND is not greater than a threshold, the task sends a request to the small-zone RFID readers for decreasing their output power. If SND is greater than a threshold the task goes to Step 2204. In Step 2205, the task checks whether there is an event to stop power control task. If there is an event to stop power control task, the task ends in Step 2206. If there is not an event to stop power control task, the task goes to Step 2201.

Figure 23:
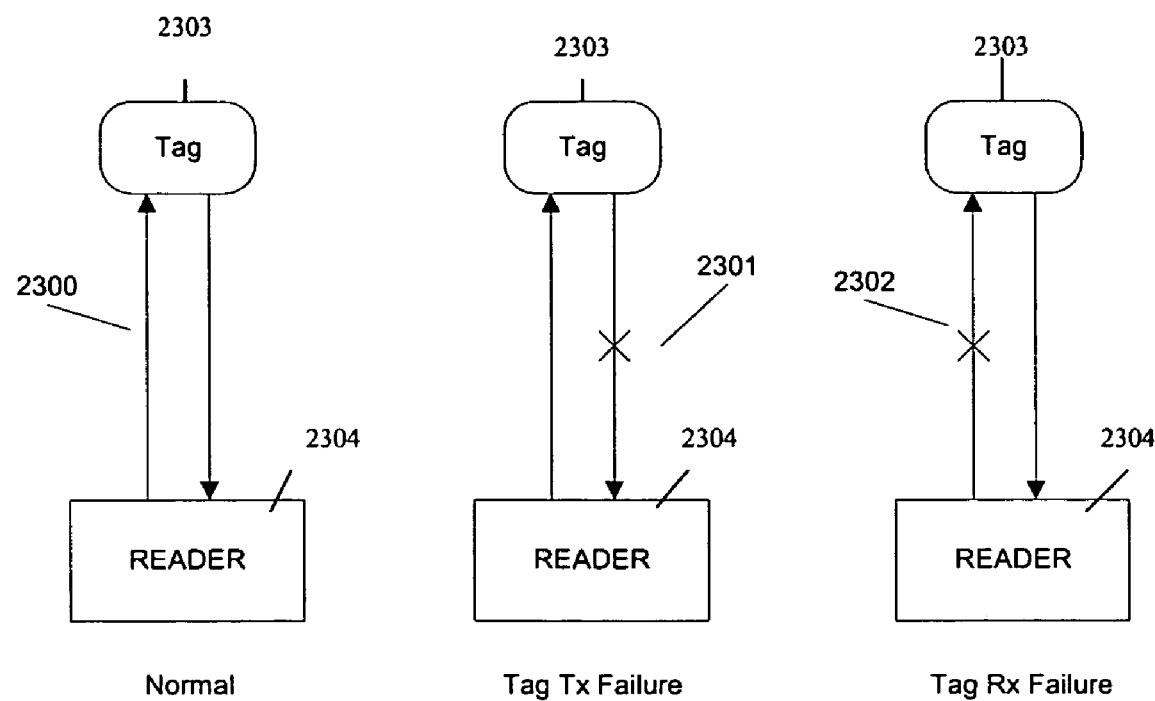
FIG. 23 is a schematic diagram of a transmitting and receiving faults of a RFID tag.

FIG. 23 is a schematic diagram of transmitting and receiving faults of an active RFID tag. In the normal condition 2300, the active RFID tag 2303 has a two-way communication with the RFID reader 2304. If there is a fault in the RFID tag's transmission path 2301, including hardware failure or a blocked transmitting path, active RFID tag 2303 can only receive RFID repetitive beacons from RFID reader 2304. If there is a fault in the tag's receiving path 2302, including hardware failure or a blocked receiving path, RFID reader can only receive repetitive request signals from active RFID tag 2303. A description of detection of a RFID tag transmitting fault is listed in Table 1.

TABLE 1

Detection of the tag's transmitting fault

| State | Transmitting Fault Detection |
|---|---|
| A 800 | Tag randomly wakes up to listen and starts a timer when it detects a reader beacon. The fault indicator is triggered when the timer exceeds a threshold and the reader is still not responding to the tag. |
| B 801 | Tag starts to count number of times that its transmitted packets are not acknowledged by the small-zone RFID reader. The fault indicator is triggered when the number exceeds a threshold. |
| C 802 | Tag starts to count number of times that its transmitted packets are not acknowledged by the large-zone RFID reader. The fault indicator is triggered when the number exceeds a threshold. |
| D 803 | There is no need for fault detection in State D because of its short duration. |

The tag's receiving fault 2302 is detected by the RFID reader that starts to count the number of times that it sends the packets to respond to the tag's association or data packets without tag's acknowledgement. The tag failure event is triggered when the number exceeds a threshold, and the event is sent to an external device, such as a backend server or RFID controller, linked to the RFID reader.

Figure 24:
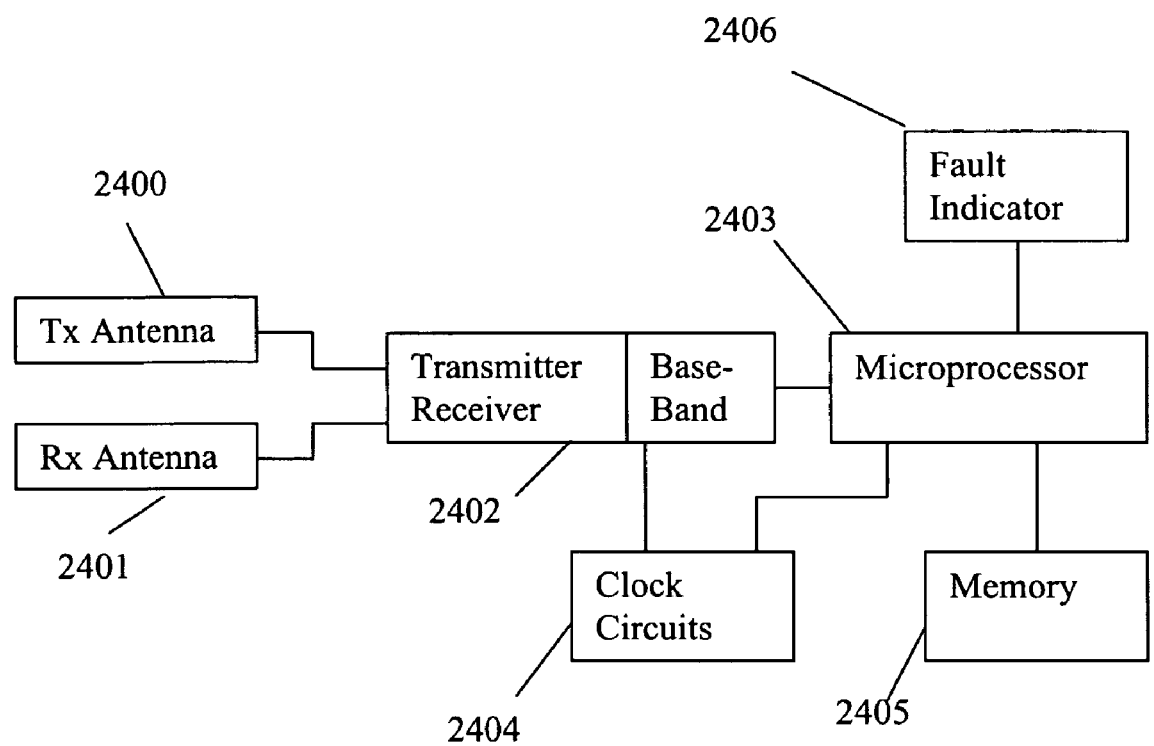
FIG. 24 is a hardware block diagram of a reliable RFID tag.

FIG. 24 is a hardware block diagram of a reliable RFID tag device including transmitting antenna 2400, receiving antenna 2401, transmitter/receiver/baseband circuits 2402, microprocessor 2403, clock circuits 2404, memory 2405, and transmitting failure indicator 2406. The use of separate transmitting antennas 2400 and receiving antennas 2401 improves RFID tag reliability. The system can detect failures as long as either one of the transmitting or receiving paths works. The transmitting fault indicator can be a light or sound generating device. In the event that the active RFID tag's transmitting path fails, transmitting fault indicator 2406 provides a means to inform the outside world about the transmitting failure 2302.

Figure 25:
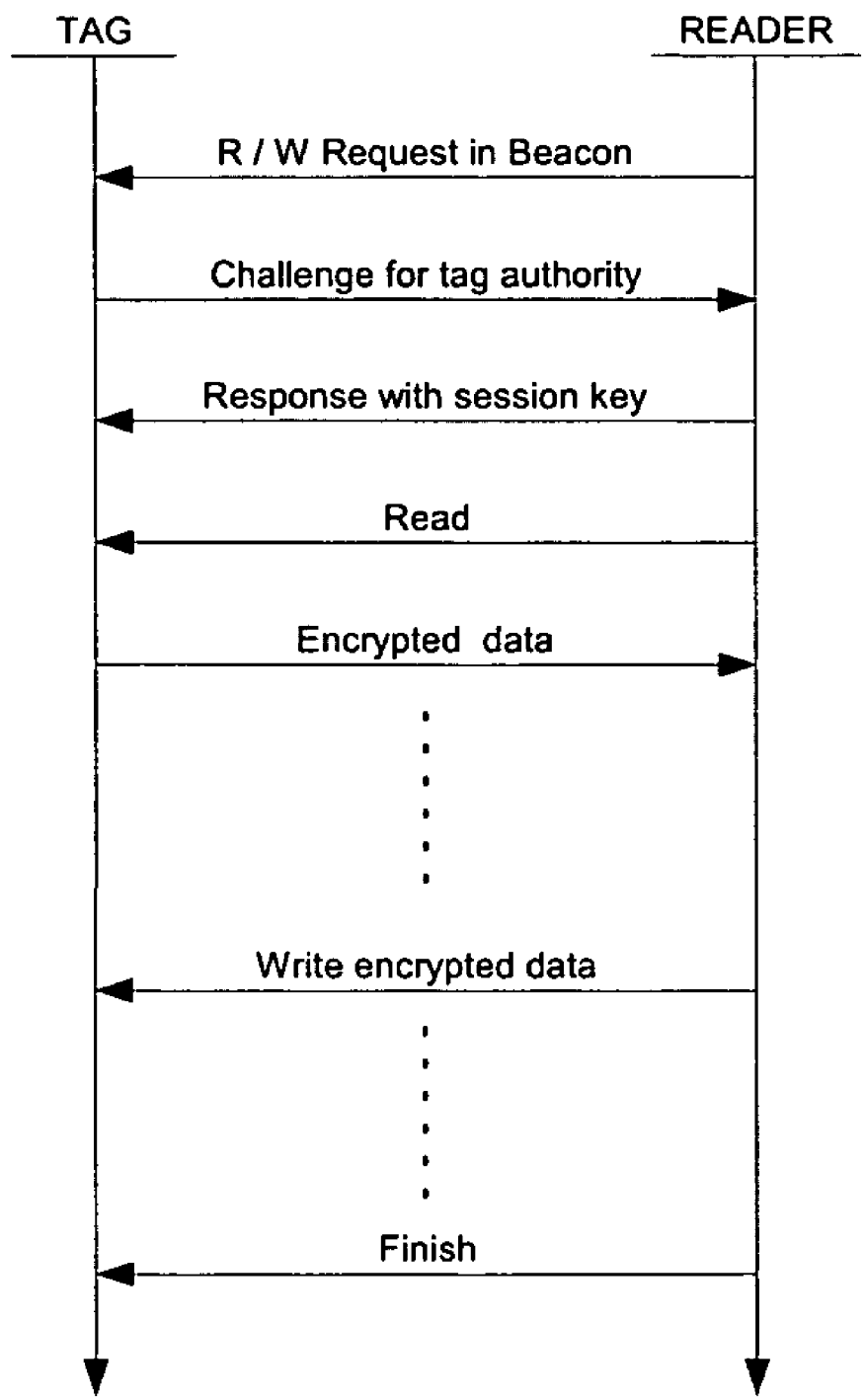
FIG. 25 is a sequence diagram for security operations between the RFID tag and RFID reader.

FIG. 25 is a sequence diagram for security operations between an active RFID tag and RFID reader. When the RFID reader sends a read or write command, the active RFID tag responds with a challenge for tag authority. The RFID reader then sends response within the session key to the active RFID tag. The response with the session key is used by both the active RFID reader and RFID tag to encrypt data for communication between them.

Figure 26:
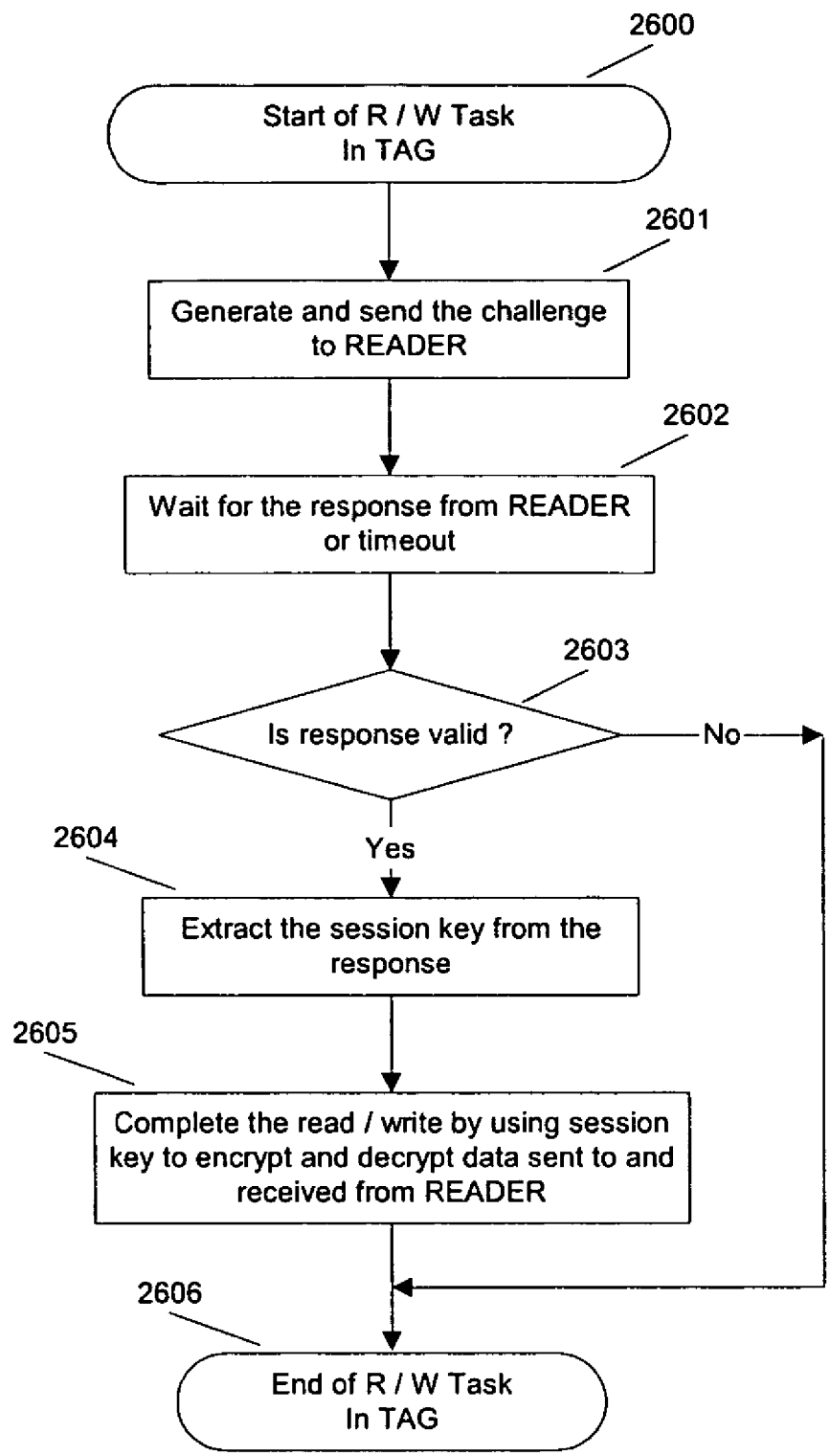
FIG. 26 is a flow chart for the RFID tag's read/write task.

FIG. 26 is a flow chart for an active RFID tag's read/write task. The task starts from Step 2600 and generates a challenge to the RFID reader in Step 2601. The task waits for the RFID reader's response or a timeout event in Step 2602. If the response is not valid in Step 2603, the task ends in Step 2606. If the response is valid, the task extracts the session key from the reader's response in Step 2604 and completes the read or write operation by using the session key to decrypt or encrypt data in Step 2605.

Figure 27:
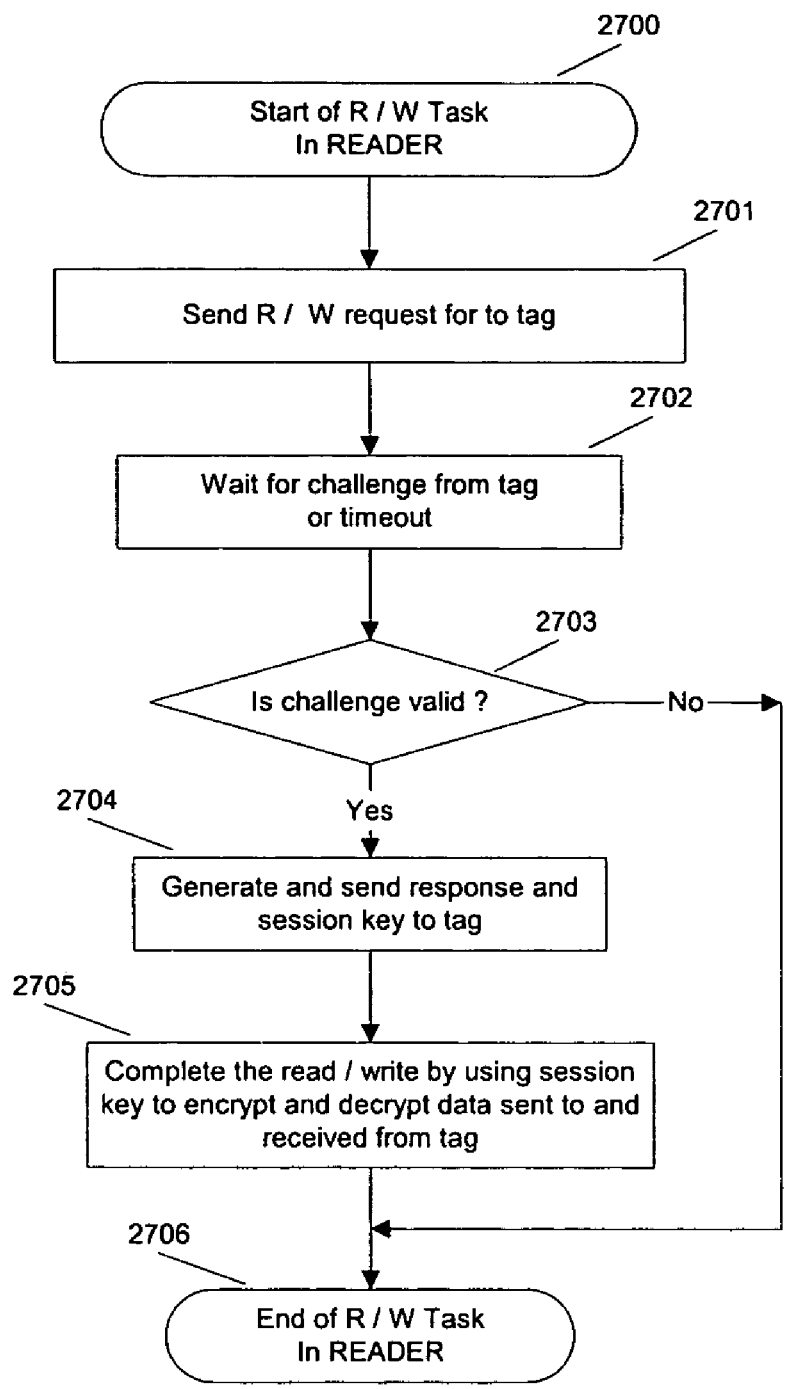
FIG. 27 shows the flow chart for the RFID reader's read/write task.

FIG. 27 is a flow chart for a RFID reader's read/write task. The task starts from Step 2700 and sends a read or write request to the RFID tag in Step 2701. The task waits for the tag challenge or a timeout event in Step 2702. The task checks whether the challenge is valid in Step 2703. If the challenge is not valid, the task ends in Step 2706. If the challenge is valid, the task generates and sends a response with the session key to the RFID tag in Step 2704 and completes the read or write operation by using the session key to decrypt or encrypt data in Step 2705.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A RFID system comprising:
   at least one small-zone RFID reader to cover an area;
   a large-zone RFID reader to cover gaps among the at least one small-zone RFID reader within the area, and
   at least one active RFID tag,
   wherein the at least one active RFID tag first try to become associated with the at least one small-zone RFID reader and if the at least one active RFID tag cannot become associated with one of the at least one small-zone RFID reader, the at least one active RFID tag that cannot become associated with the small-zone RFID reader is associated with the large-zone RFID reader.

2. The RFID system of claim 1 wherein said at least one small-zone RFID reader and said large-zone RFID reader simultaneously operate using multiple frequencies.

3. The RFID system of claim 2 wherein each of said small-zone RFID readers and said large-zone RFID reader has a frame structure comprising a beacon period, a contention access period, and a scan period.

4. The RFID system of claim 3 wherein each of said at least one active RFID tag repetitively broadcasts request-association signals to any of said at least one small-zone RFID reader and said large-zone RFID reader,
if said at least one active RFID tag is associated with said at least one small-zone RFID reader, said at least one active RFID tag communicates with the associated at least one small-zone RFID reader during the contention access period and said at least one active RFID tag stops sending said request-association signals; or
if said at least one active RFID tag is associated with said large-zone RFID reader, said at least one active RFID tag communicates with the associated large-zone RFID reader during the contention access period and said at least one active RFID tag sends repetitive said request-association signals in said scan period.

5. The RFID system of claim 4 wherein said at least one small-zone RFID reader or said large-zone RFID reader uses the scan period to detect said request-association signals,
if the request-association signals are received at said at least one small-zone RFID reader or said large-zone RFID reader, said at least one small-zone RFID reader or said large-zone RFID reader directs said at least one active RFID tag to a beacon channel of said at least one small-zone RFID reader or said large-zone RFID reader, which received the request-association signals to complete the association process between said at least one active RFID tag and said at least one small-zone RFID reader or said large-zone RFID reader and uses the beacon period and the contention access period to communicate with said at least one active RFID tag that has become associated with said at least one small-zone RFID reader or said large-zone RFID reader.

6. The RFID system of claim 4 wherein after said at least one small-zone RFID reader detects said request-association signals, said at least one small-zone RFID reader listens to a scan channel for a monitoring window, said monitoring window being based on a received signal strength indicator (RSSI) of a signal transmitted by said at least one active RFID tag.

7. The RFID system of claim 6 wherein a length of said monitoring window of said small-zone RFID reader is inversely proportional to said RSSI of the signal transmitted by said at least one active RFID tag.

8. The RFID system of claim 4 wherein after said large-zone RFID reader detects said request-association signals, said large-zone RFID reader listens to a scan channel for a monitoring window, said monitoring window being greater than any said monitoring window of said small-zone RFID readers.

9. The RFID system of claim 1 wherein said at least one small-zone RFID reader and said large-zone RFID reader simultaneously operate using a single frequency.

10. The RFID system of claim 9 wherein each of said small-zone RFID readers and said large-zone RFID readers has a frame structure comprising a beacon period, a contention access period, and a scan period.

11. The RFID system of claim 10 wherein each of said at least one active RFID tag repetitively broadcasts request-association signals to any of said at least one small-zone RFID reader and said large-zone RFID reader,
if said at least one active RFID tag is associated with said at least one small-zone RFID reader, said at least one active RFID tag communicates with the associated at least one small-zone RFID reader during the contention access period and said at least one active RFID tag stops sending said request-association signals; or
if said at least one active RFID tag is associated with said large-zone RFID reader, said at least one active RFID tag communicates with the associated said large-zone RFID reader during the contention access period and said at least one active RFID tag repetitively sends said request-association signals in said scan period.

12. An RFID system of claim 11 wherein each of said at least one small-zone RFID reader adjusts its beacon period to follow an end of the contention access period of said large-zone RFID reader plus a small random time period.

13. The RFID system of claim 11 wherein said at least one small-zone RFID reader or said large-zone RFID reader uses the scan period to detect said request-association signals,
if the request-association signals are received at said at least one small-zone RFID reader or said large-zone RFID reader, said at least one small-zone RFID reader or said large-zone RFID reader directs said at least one active RFID tag to a beacon channel of said at least one small-zone RFID reader or said large-zone RFID reader which received the request-association signals to complete the association process between said at least one active RFID tag and said at least one small-zone RFID reader or said large-zone RFID reader and uses the beacon period and the contention access period to communicate with the at least one active RFID tag that has become associated with said at least one small-zone RFID reader or said large-zone RFID reader.

14. The RFID system of claim 11 wherein after said at least one small-zone RFID reader detects said request-association signals, said at least one small-zone RFID reader listens to a scan channel for a monitoring window, said monitoring window being based on a received signal strength indicator (RSSI) of a signal transmitted by said at least one active RFID tag.

15. The RFID system of claim 14 wherein a length of said monitoring window is inversely proportional to said RSSI of the signal transmitted by said at least one active RFID tag.

16. The RFID system of claim 11 wherein after said large-zone RFID reader detects said request-association signals, said large-zone RFID reader listens to a scan channel for a monitoring window, said monitoring window being greater than any said monitoring window of said small-zone RFID readers.

17. The RFID system of claim 1 wherein said large-zone RFID reader checks the number of active RFID tags that are associated with the large-zone RFID reader; and
said large-zone RFID reader sends a request to said at least one small-zone RFID reader to increase their output power if the number of active RFID tags that are associated with the large-zone RFID reader is greater than a first threshold; or
said large-zone RFID reader sends a request to said at least one small-zone RFID reader to reduce their output power if the number of active RFID tags that are associated with the large-zone RFID reader is lower than a second threshold.

18. The RFID system of claim 1 wherein the at least one RFID active tag comprises:
a transmitter section operable to transmit packets to said at least one small-zone RFID reader and/or said large-zone RFID reader using a transmitter antenna;
a receiver section operable to receive packets from said at least one small-zone RFID reader and/or said large-zone RFID reader using a receiver antenna; and
a transmitting fault indicator generating audible or visible alarms depending on a condition of said transmission section or said receiver section.

19. The RFID system of claim 18 wherein said at least one active RFID tag broadcasts repetitive, request-association signals to associate said at least one active RFID tag with said at least one small-zone RFID reader or said large-zone RFID reader, randomly wakes up to listen to beacons of said small-zone RFID reader or said large-zone RFID reader when said at least one active RFID tag is not associated with any said small-zone RFID reader or said large-zone RFID reader, starts to measure time after detecting a first beacon of said at least one small-zone RFID reader or said large-zone RFID reader, and counts a number of transmitted packets from said at least one active RFID tag that are not acknowledged by said small-zone RFID reader or said large-zone RFID reader when it is associated with the said small-zone RFID reader or said large-zone RFID reader.

20. The RFID system of claim 19 wherein the at least one active RFID tag triggers said fault indicator when elapsed time after detecting the first beacon is greater than a time threshold or when a number of packets that are not acknowledged by the associated said small-zone RFID reader or said large-zone RFID reader exceeds a threshold.

21. The RFID system of claim 19 wherein said at least one small-zone RFID reader or said large-zone RFID reader counts a number of unacknowledged packets sent to said at least one active RFID tag when said at least one active RFID tag is associated with said at least one small-zone RFID reader or said large-zone RFID reader; and
sends an event indicating a tag receiving fault to an external device linked to the said small-zone RFID reader or said large-zone RFID reader when the number of unacknowledged packets exceeds a threshold for triggering said fault indicator.

22. The RFID system of claim 1 wherein said at least one small-zone RFID reader and/or said large-zone RFID reader sends a read/write request to said at least one active RFID tag;
said at least one active RFID tag responds with a challenge packet to tag authority;
said at least one small-zone RFID reader and/or large-zone RFID reader sends a response including a session key;
said at least one active RFID tag decodes the session key; and
both said at least one small-zone RFID and/or large-zone RFID reader and said at least one active RFID tag use the session key to encrypt and decrypt data sent between them.

23. A RFID system comprising:
at least one small-zone RFID reader using multiple-frequencies to cover an area;
a large-zone RFID reader to cover gaps among the at least one small-zone RFID reader within the area, and
at least one active RFID tag,
wherein the at least one active RFID tag first try to become associated with the at least one small-zone RFID reader and if the at least one active RFID tag cannot become associated with one of the at least one small-zone RFID reader, the at least one active RFID tag that cannot become associated with the small-zone RFID reader is associated with the large-zone RFID reader.

24. A RFID system comprising:
at least one small-zone RFID reader using a single frequency to cover an area;
a large-zone RFID reader to cover gaps among the at least one small-zone RFID reader within the area, and
at least one active RFID tag,
wherein the at least one active RFID tag first try to become associated with the at least one small-zone RFID reader and if the at least one active RFID tag cannot become associated with one of the at least one small-zone RFID reader, the at least one active RFID tag that cannot become associated with the small-zone RFID reader is associated with the large-zone RFID reader.

25. A RFID system comprising:
at least one RFID reader, and
at least one active RFID tag, said active RFID tag comprising;
a transmitter section operable to transmit packets to a RFID reader using a transmitter antenna;
a receiver section operable to receive packets from said RFID reader using a receiver antenna; and
a transmitting fault indicator generating audible or visible alarms depending on a condition of said transmission section or said receiver section.

26. The RFID system of claim 25 wherein said active RFID tag broadcasts repetitive, request-association signals to associate said active RFID tag with the RFID reader, randomly wakes up to listen to beacons of the RFID reader when the active RFID tag is not associated with any said RFID reader, starts to measure time after detecting a first beacon of said RFID reader, and counts a number of transmitted packets from said active RFID tag that are not acknowledged by said RFID reader when it is associated with the said RFID reader.

27. The RFID system of claim 26 wherein said active RFID tag triggers said fault indicator when elapsed time after detecting the first beacon is greater than a time threshold or when a number of packets that are not acknowledged by the associated RFID reader exceeds a threshold.

28. The RFID system of claim 26 wherein said RFID reader counts the number of unacknowledged packets sent to said RFID tag for responding to the request-association packets; and
sends an event indicating a tag receiving fault to an external device linked to said RFID reader when the number of unacknowledged packets exceeds a threshold for triggering said fault indicator.

29. A method of operating a RFID system comprising the steps of:
operating at least one small-zone RFID reader to cover an area;
operating a large-zone RFID reader to cover gaps among the at least one small-zone RFID reader within the area, and
operating at least one active RFID tag,
wherein the at least one active RFID tag first try to become associated with the at least one small-zone RFID reader and if the at least one active RFID tag cannot become associated with one of the at least one small-zone RFID reader, the at least one active RFID tag that cannot become associated with the small-zone RFID reader is associated with the large-zone RFID reader.

30. The method of claim 29 wherein said at least one small-zone RFID reader and said large-zone RFID reader simultaneously operate using multiple frequencies.

31. The method of claim 29 wherein each of said small-zone RFID readers and said large-zone RFID reader has a frame structure comprising a beacon period, a contention access period, and a scan period.

32. The method of claim 31 further comprising the steps of:
   each of said at least one active RFID tag repetitively broadcasting request-association signals to any of said at least one small-zone RFID reader and said large-zone RFID reader,
   if said at least one active RFID tag is associated with said at least one small-zone RFID reader, said at least one active RFID tag communicating with the associated at least one small-zone RFID reader during the contention access period and said at least one active RFID tag stops sending said request-association signals; or
   if said at least one active RFID tag is associated with said large-zone RFID reader, said at least one active RFID tag communicating with the associated large-zone RFID reader during the contention access period and said at least one active RFID tag repetitively sends said request-association signals in said scan period.

33. The method of claim 32 further comprising the steps of:
   detecting said request-association signals at said at least one small-zone RFID reader or said large-zone RFID reader during the scan period;
   if the request-association signals are detected at said at least one small-zone RFID reader or said large-zone RFID reader, directing said at least one active RFID tag to a beacon channel of said at least one small-zone RFID reader or said large-zone RFID reader which received the request-association signals to complete the association process between said at least one active RFID tag and said at least one small-zone RFID reader or said large-zone RFID reader and communicating during the beacon period and the contention access period with said at least one active RFID tag that has become associated with said at least one small-zone RFID reader or said large-zone RFID reader.

34. The method of claim 32 wherein after said at least one small-zone RFID reader detects said request-association signals further comprising the steps of:
   said at least one small-zone RFID reader listening to a scan channel for a monitoring window, said monitoring window being based on a received signal strength indicator (RSSI) of a signal transmitted by said at least one active RFID tag.

35. The method of claim 34 wherein a length of said monitoring window is inversely proportional to said RSSI of the signal transmitted by at least one active RFID tag.

36. The method of claim 32 wherein after said at large-zone RFID reader detects said request-association signals further comprising the steps of:
   said large-zone RFID reader listening to a scan channel for a monitoring window, said monitoring window being greater than any monitoring window of said small-zone RFID readers.

37. The method of claim 29 wherein said at least one small-zone RFID reader and said large-zone RFID reader simultaneously operate using a single frequency.

38. The method of claim 37 wherein each of said small-zone RFID readers and said large-zone RFID reader has a frame structure comprising a beacon period, a contention access period, and a scan period.

39. The method of claim 38 further comprising the steps of:
   each of said at least one active RFID tag repetitively broadcasting request-association signals to any of said at least one small-zone RFID reader and said large-zone RFID reader,
   if said at least one active RFID tag is associated with said at least one small-zone RFID reader, said at least one active RFID tag communicating with the associated at least one small-zone RFID reader during the contention access period and said at least one active RFID tag stops sending said request-association signals; or
   if said at least one active RFID tag is associated with said large-zone RFID reader, said at least one active RFID tag communicating with the associated large-zone RFID reader during the contention access period and said at least one active RFID tag repetitively sends said request-association signals in said scan period.

40. An method of claim 39 wherein each of said at least one small-zone RFID reader adjusts its beacon period to follow an end of the contention access period of said large-zone RFID reader plus a small random time period.

41. The method of claim 39 further comprising the step of:
   detecting said request-association signals at said at least one small-zone RFID reader or said large-zone RFID reader during the scan period;
   if the request-association signals are detected at said at least one small-zone RFID reader or said large-zone RFID reader, directing said at least one active RFID tag to a beacon channel of said at least one small-zone RFID reader or said large-zone RFID reader which received the request-association signals to complete the association process between said at least one active RFID tag and said at least one small-zone RFID reader or said large-zone RFID reader and communicating during the beacon period and the contention access period with the at least one active RFID tag that has become associated with said at least one small-zone RFID reader or said large-zone RFID reader.

42. The method of claim 39 wherein after said at least one small-zone RFID reader detects said request-association signals further comprising the steps of:
   said at least one small-zone RFID reader listening to a scan channel for a monitoring window, said monitoring window being based on a received signal strength indicator (RSSI) of a signal transmitted by at least one active RFID tag.

43. The method of claim 42 wherein a length of said monitoring window is inversely proportional to said RSSI of the signal transmitted by said at least one active RFID tag.

44. The method of claim 39 wherein after said large-zone RFID reader detects said request-association signals further comprising the steps of:
   said large-zone RFID reader listening to a scan channel for a monitoring window, said monitoring window being greater than any monitoring window of said small-zone RFID readers.

45. The method of claim 29 further comprising the step of said large-zone RFID reader checking the number of active RFID tags that are associated with said large-zone RFID reader; and said large-zone RFID reader sending a request to said at least one small-zone RFID reader to increase their output power if the number of active RFID tags that are associated with the large-zone RFID reader is greater than a first threshold; or said large-zone RFID reader sending a request to said at least one small-zone RFID reader to reduce their output power if the number of active RFID tags that are associated with the large-zone RFID reader is lower than a second threshold.

46. The method of claim 29 wherein the at least one RFID active tag comprises:

a transmitter section operable to transmit packets to said at least one small-zone RFID reader and/or said large-zone RFID reader using a transmitter antenna;

a receiver section operable to receive packets from said at least one small-zone RFID reader and/or said large-zone RFID reader using a receiver antenna; and a transmitting fault indicator generating audible or visible alarms depending on a condition of said transmission section or said receiver section.

47. The method of claim 46 further comprising the step of:

said at least one active RFID tag sending repetitive, request-association signals to associate said at least one active RFID tag with said at least one small-zone RFID reader or said large-zone RFD reader;

randomly waking up to listen to beacons of said small-zone RFID reader or said large-zone RFID reader when said at least one active RFID tag is not associated with any said small-zone RFID reader or said large-zone RFID reader;

starting to measure time after detecting a first beacon of said at least one small-zone RFID reader or said large-zone RFID reader; and counting a number of transmitted packets from said at least one active RFID tag that are not acknowledged by said small-zone RFID reader or said large-zone RFID reader when it is associated with the associated small-zone RFID reader or said large-zone RFID reader.

48. The method of claim 47 further comprising the step of:

triggering said fault indicator when elapsed time after detecting the first beacon is greater than a time threshold or when a number of packets that are not acknowledged by the associated small-zone RFID reader or said large-zone RFID reader exceeds a threshold.

49. The method of claim 46 further comprising the steps of:

said at least one small-zone RFID reader or said large-zone RFID reader counting a number of unacknowledged packets sent to said at least one active RFID tag when said at least one active RFID tag is associated with at least one small-zone RFID reader or said large-zone RFID reader; and sending an event indicating a tag receiving fault to an external device linked to the said small-zone RFID reader or said large-zone RFID reader when the number of unacknowledged packets exceeds a threshold for triggering said fault indicator.

50. The method of claim 29 further comprising the steps of:

said at least one small-zone RFID reader and/or said large-zone RFID reader sending a read/write request to said at least one active RFID tag;

said at least one active RFID tag responding with a challenge packet to tag authority;

said at least one small-zone RFID reader and/or large-zone RFID reader sending a response including a session key;

said at least one active RFID tag decoding the session key; and both said at least one small-zone RFID and/or large-zone RFID reader and said at least one active RFID tag using the session key to encrypt and decrypt data sent between them.

51. The method of claim 29 further comprising the following steps:

the at least one active RFID tag setting a TRANSIT flag if it detects changes in receiving a new RFID reader identification ID number from said at least one small-zone RFID reader or said large-zone RFID reader which is different from the previously stored RFID reader identification ID number;

the active RFID tag clearing said TRANSIT flag if it does not detect changes in said previously stored RFID reader identification ID number for a period of time exceeding a threshold;

the active RFID tag sending transit event to said at least one small-zone RFID reader or said large-zone RFID reader that is associated with said at least one active RFID tag; and said at least one small-zone RFID reader or said large-zone RFID reader using the transit event to select all the active RFID tags with their TRANSIT flag set.

52. A method for improving RFID tag security in a RFID system comprising the following steps:

sending a read/write request from a RFID reader to a RFID tag;

sending a response from said RFID tag including a challenge packet to tag authority;

sending a response from said RFID reader including session key;

decoding the session key at said RFID tag; and using the session key at the RFID reader and RFID tag to encrypt and decrypt data sent between them.

* * * * *